United States Patent
Pino, Jr. et al.

(10) Patent No.: US 10,781,942 B2
(45) Date of Patent: Sep. 22, 2020

(54) METHOD OF INSTALLING OPTICAL FIBER AND/OR INNERDUCT/MICRODUCT UNDER A ROADWAY SURFACE USING A FILL MASK TO PREVENT FILL MATERIAL FROM BONDING TO THE ROADWAY SURFACE

(71) Applicant: CCIIP LLC, New York, NY (US)

(72) Inventors: Angleo J. Pino, Jr., New York, NY (US); Daniel Urban, Austin, TX (US)

(73) Assignee: CCIIP LLC, New York, NY (US)

( * ) Notice: Subject to any disclaimer, the term of this patent is extended or adjusted under 35 U.S.C. 154(b) by 0 days.

(21) Appl. No.: 16/798,616

(22) Filed: Feb. 24, 2020

(65) Prior Publication Data

US 2020/0200292 A1    Jun. 25, 2020

Related U.S. Application Data

(63) Continuation-in-part of application No. 16/371,675, filed on Apr. 1, 2019, now Pat. No. 10,571,047, and a continuation-in-part of application No. 16/183,780, filed on Nov. 8, 2018, now Pat. No. 10,571,045, which is a continuation-in-part of application No. 16/000,628, filed on Jun. 5, 2018, now Pat. No. 10,641,414, and a continuation of application No. 15/878,945, filed on Jan. 24, 2018, now abandoned.

(Continued)

(51) Int. Cl.
| | |
|---|---|
| *H02G 9/00* | (2006.01) |
| *E02F 5/02* | (2006.01) |
| *F16L 1/11* | (2006.01) |
| *H02G 9/02* | (2006.01) |
| *F16L 1/028* | (2006.01) |
| *H02G 1/06* | (2006.01) |
| *E02F 5/22* | (2006.01) |
| *E02F 5/12* | (2006.01) |
| *E02F 5/10* | (2006.01) |
| *E02F 9/24* | (2006.01) |
| *E02F 5/08* | (2006.01) |
| *H02G 9/06* | (2006.01) |

(52) U.S. Cl.
CPC .................. *F16L 1/11* (2013.01); *E02F 5/08* (2013.01); *E02F 5/10* (2013.01); *E02F 5/101* (2013.01); *E02F 5/12* (2013.01); *E02F 5/226* (2013.01); *E02F 9/245* (2013.01); *F16L 1/028* (2013.01); *H02G 1/06* (2013.01); *H02G 9/02* (2013.01); *H02G 9/025* (2013.01); *H02G 9/06* (2013.01)

(58) Field of Classification Search
CPC .................................. H02G 9/00; G02B 6/504
See application file for complete search history.

(56) References Cited

U.S. PATENT DOCUMENTS

| 4,668,548 A | 5/1987 | Lankard |
| 4,744,693 A | 5/1988 | Smith |

(Continued)

FOREIGN PATENT DOCUMENTS

| CA | 2348062 | 11/2001 |
| WO | 2016/088083 | 9/2016 |

*Primary Examiner* — Sean D Andrish
(74) *Attorney, Agent, or Firm* — Jeffrey S. Melcher; Melcher Patent Law PLLC

(57) ABSTRACT

A method of using a fill mask to prevent overfill and/or spillage of a fill material from bonding to the roadway surface or staining the roadway surface during filling of a microtrench.

26 Claims, 27 Drawing Sheets

Related U.S. Application Data

(60) Provisional application No. 62/851,405, filed on May 22, 2019, provisional application No. 62/799,136, filed on Jan. 31, 2019, provisional application No. 62/684,862, filed on Jun. 14, 2018.

(56) References Cited

U.S. PATENT DOCUMENTS

| | | | |
|---|---|---|---|
| 4,812,078 A | 3/1989 | Rivard | |
| 5,244,304 A | 9/1993 | Weil | |
| 5,913,638 A | 6/1999 | Lansdale | |
| 7,914,618 B1 | 3/2011 | Krozel | |
| 8,899,871 B2 * | 12/2014 | Durante | E01C 7/358 404/75 |
| 9,485,468 B2 | 11/2016 | Pino | |
| 2004/0149174 A1 | 8/2004 | Farrington | |
| 2005/0036749 A1 | 2/2005 | Vogel | |
| 2010/0047021 A1 * | 2/2010 | Scola | E02D 19/14 405/179 |
| 2013/0011198 A1 | 1/2013 | Purcell | |
| 2013/0284070 A1 | 10/2013 | Dubey | |
| 2015/0125218 A1 | 5/2015 | Gustavsson | |
| 2016/0376767 A1 | 12/2016 | Miller | |
| 2018/0106015 A1 | 4/2018 | Pino | |
| 2018/0156357 A1 | 6/2018 | Pino | |
| 2018/0292027 A1 | 10/2018 | Pino | |
| 2019/0086002 A1 | 3/2019 | Pino | |
| 2019/0226603 A1 | 7/2019 | Pino | |

* cited by examiner

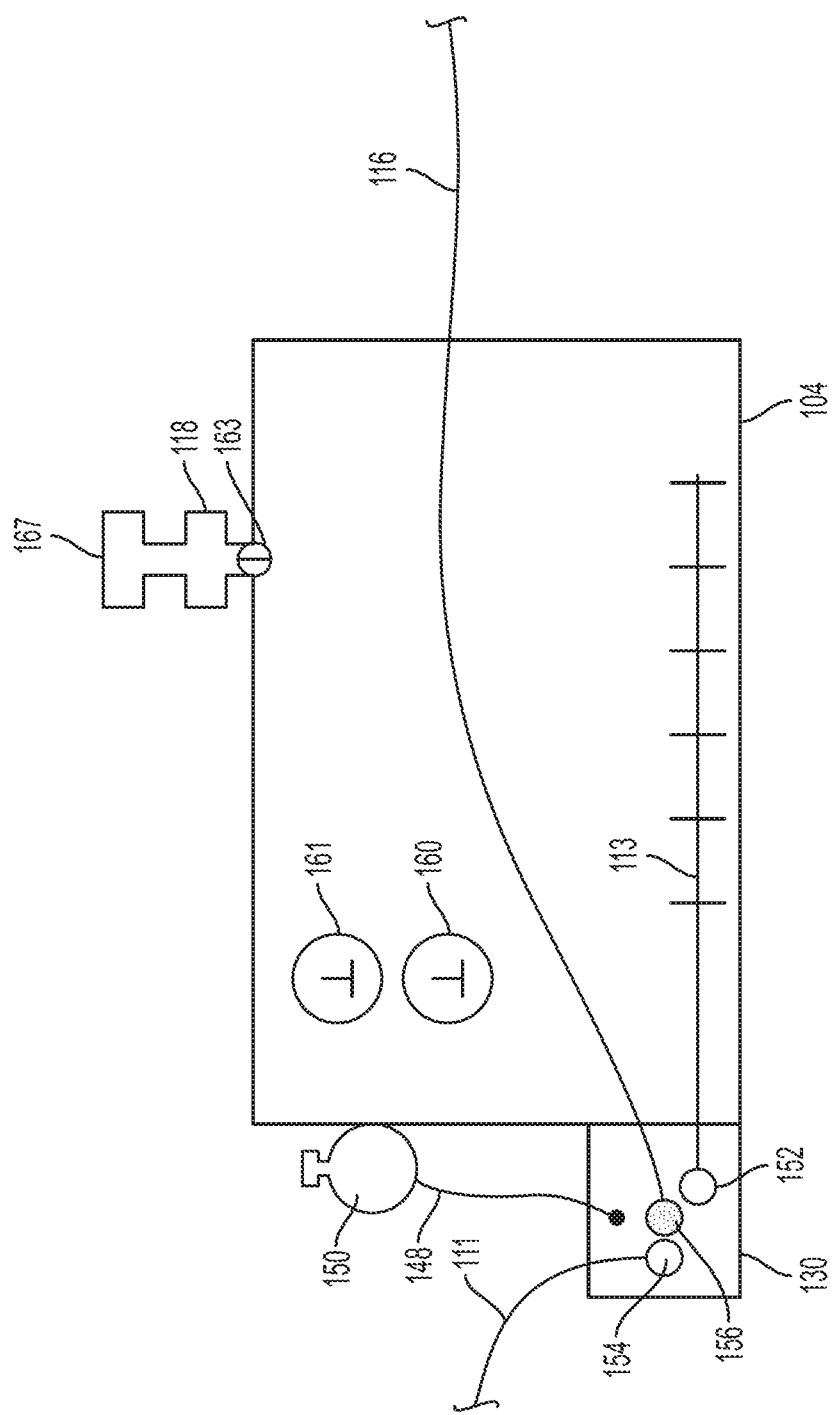

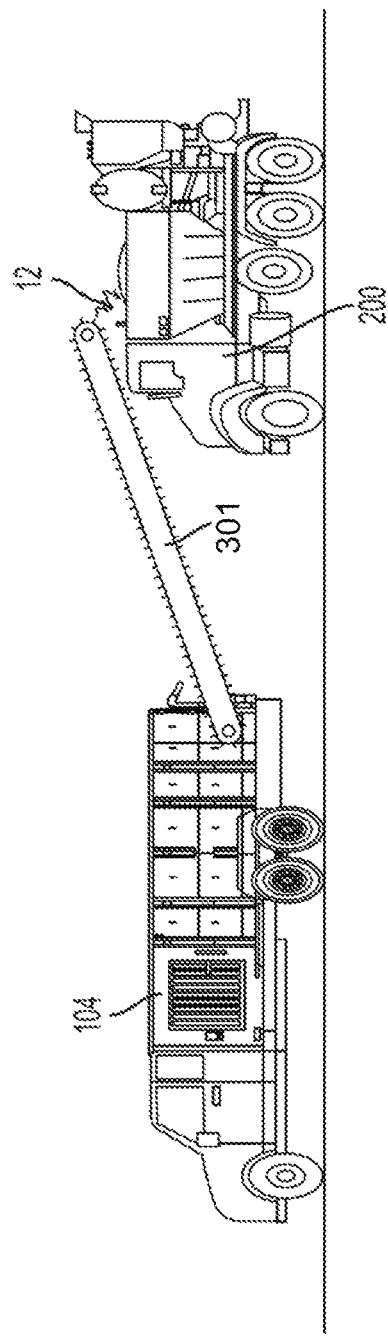
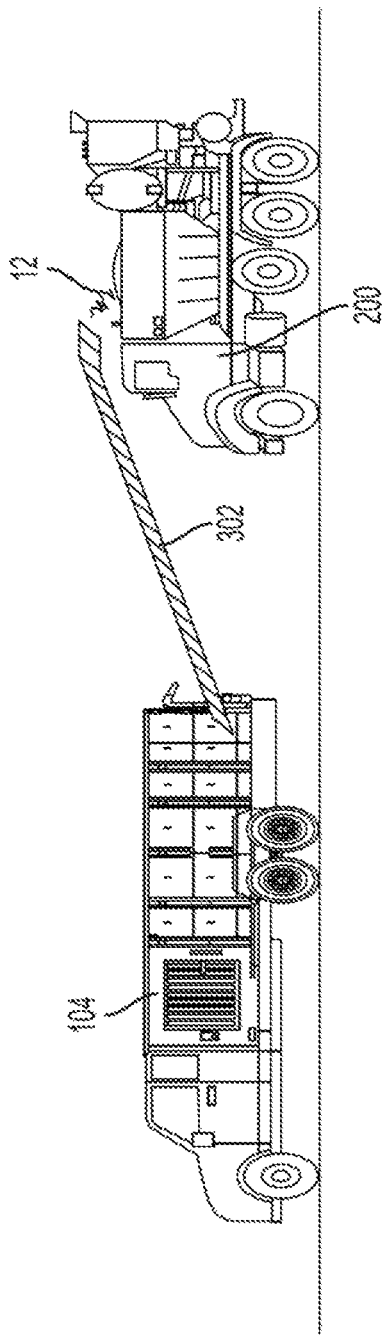

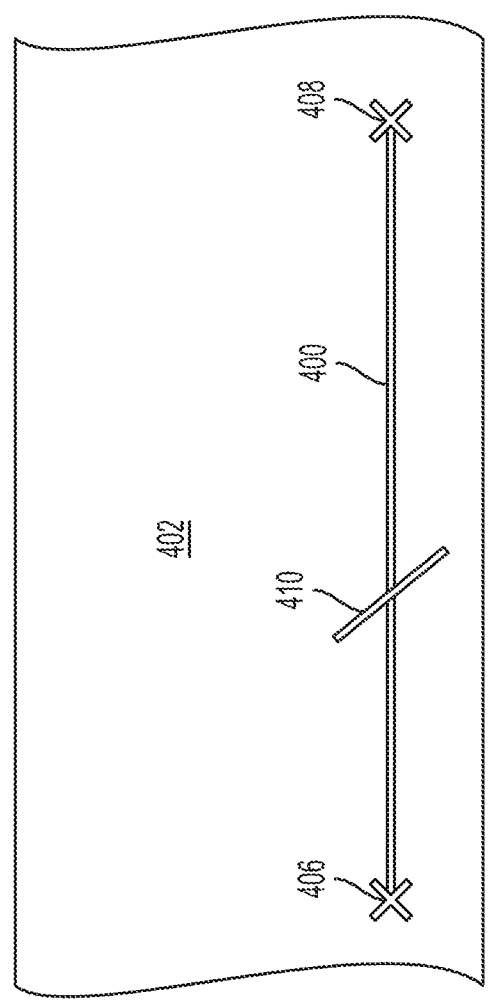

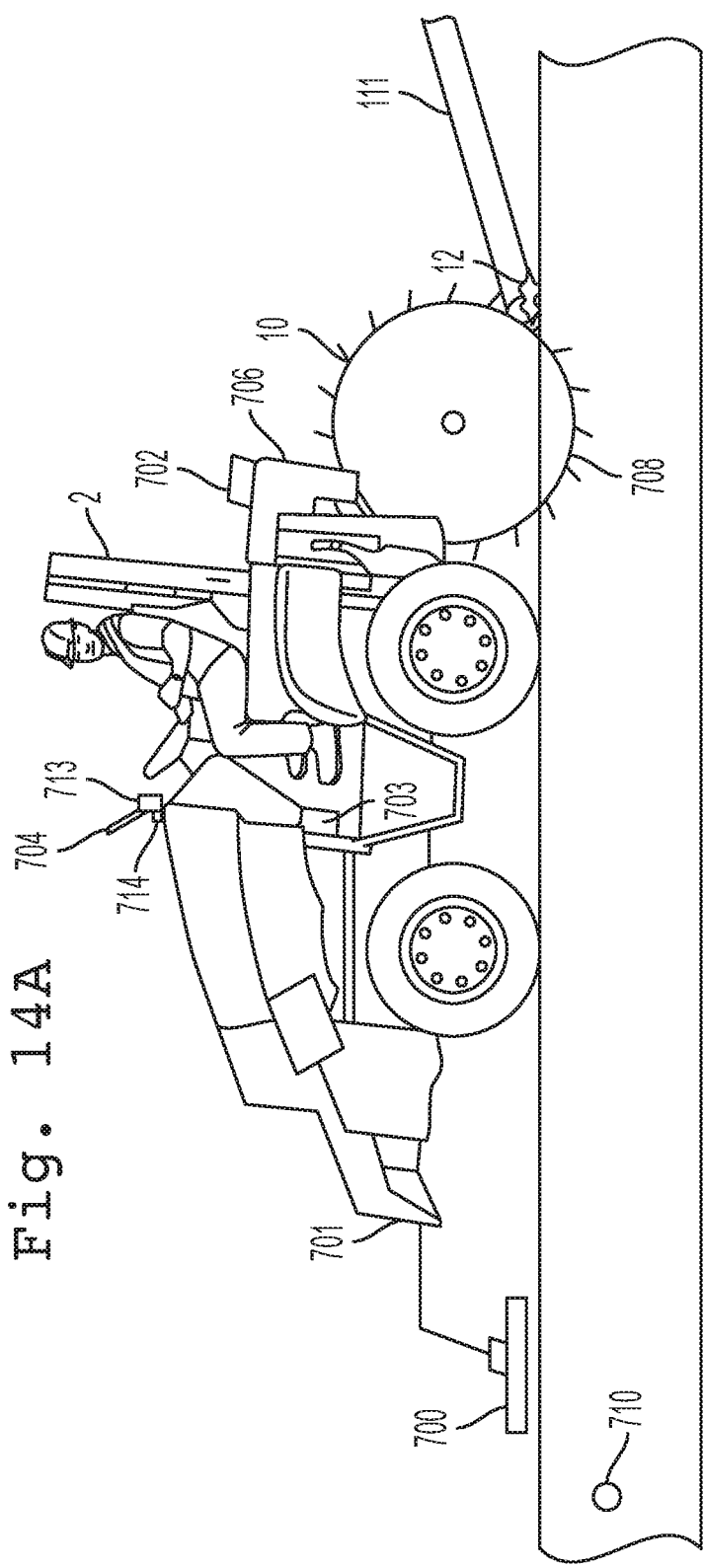

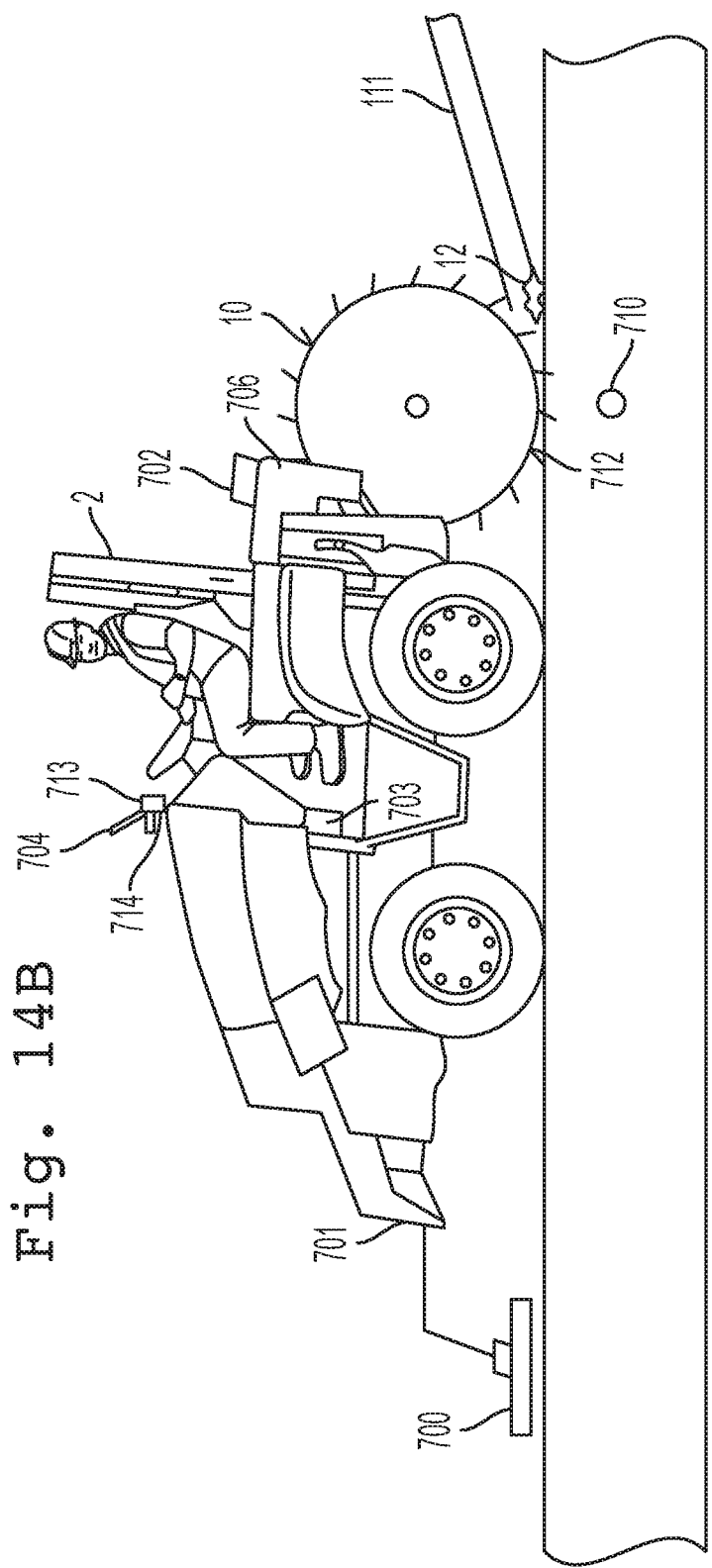

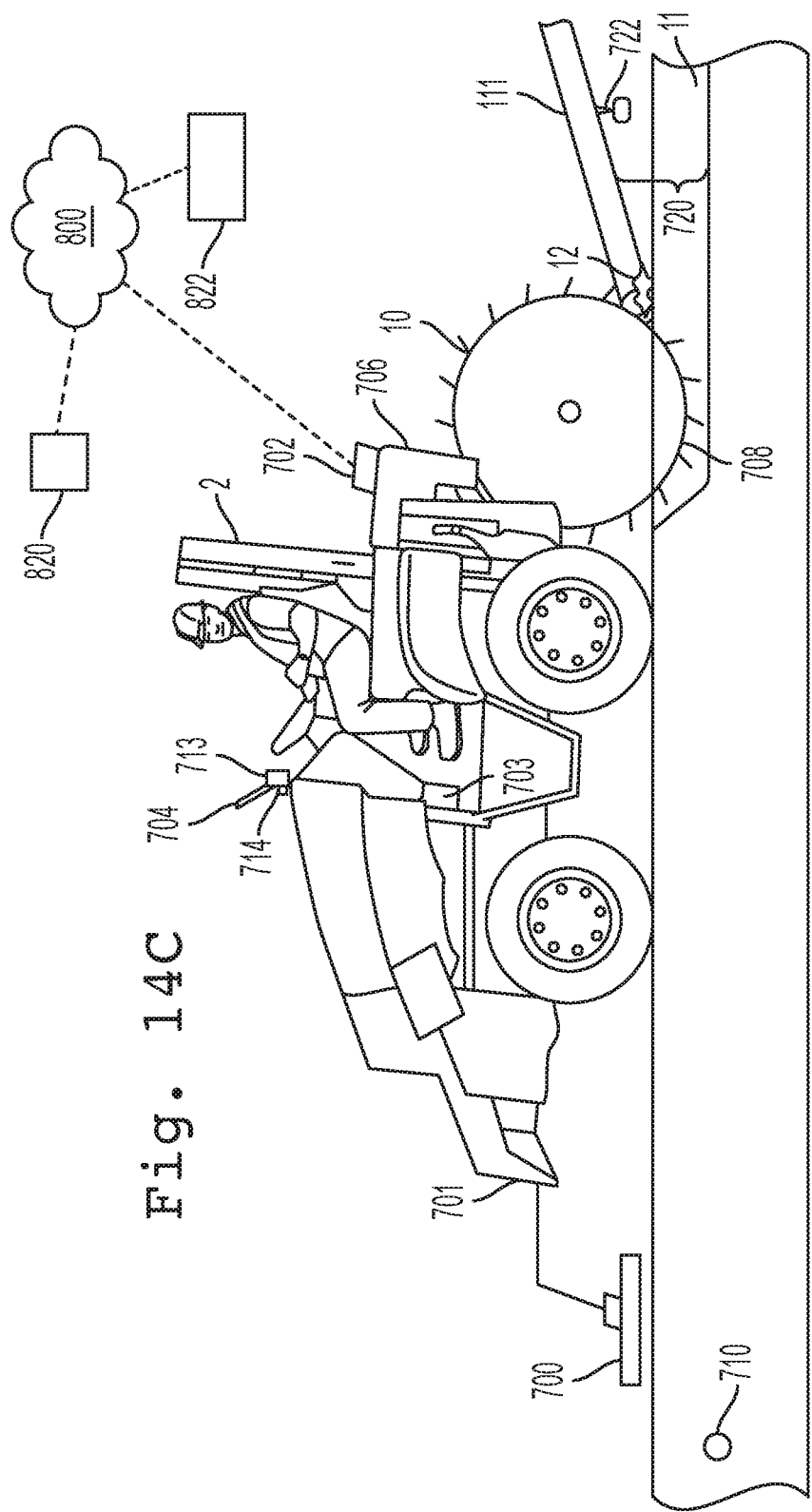

METHOD OF INSTALLING OPTICAL FIBER AND/OR INNERDUCT/MICRODUCT UNDER A ROADWAY SURFACE USING A FILL MASK TO PREVENT FILL MATERIAL FROM BONDING TO THE ROADWAY SURFACE

FIELD OF THE INVENTION

The invention generally relates to a fill mask applied to a roadway surface having a microtrench to prevent overfilled and/spillage of fill material from bonding to the roadway surface or staining the roadway surface when the fill is applied over an optical fiber and/or innerduct/microduct in the microtrench.

BACKGROUND OF THE INVENTION

Conventional devices for the trenching and laying cable or duct cannot be used continuously. The micro trencher saw usually creates a pile of spoil (dirt, asphalt, concrete, etc.) alongside the formed trench and the trench must be cleaned before laying the cable in the trench. The pile of spoil must then be removed. A fill, also referred to as cement or grout, is inserted into the trench on top of the cable or innerduct/microduct. Large industrial vacuum trailers have been used to remove the piled up spoil. However, many hours are wasted by having to dump the spoil from the trailers.

There is a great need for a device that can be used to continuously remove and in some instances recycle the spoil to in effort to increase the speed for placing the cable and/or innerduct/microduct and to reduce the down time of roadways, and also to reduce production costs.

While the vacuum truck concept is known in the industry, there is no current vacuum system that allows one to use a second vacuum or one vacuum to expel the cutting spoils into a cement/zim mixer or container allowing for the material to be recycled.

Installing new optical fiber networks to a location is expensive and time consuming. There is a great need for faster and less expensive installation of optical fiber networks.

When filling the microtrench, the overfill and/or spillage of fill undesirably stains or bonds to the roadway surface.

SUMMARY OF THE INVENTION

An objective of the invention is to provide a faster and more efficient method of microtrenching. Another objective of the invention is to avoid overfill and/or spillage of the fill from bonding to the roadway surface or staining the roadway surface.

The above objectives and other objectives can be obtained by a method of installing an optical fiber and/or innerduct/microduct under a roadway surface comprising:
   cutting a microtrench in a roadway with a microtrencher;
   installing an optical fiber and/or innerduct/microduct in the microtrench;
   applying a fill mask composition on a roadway surface to form a fill mask on the roadway surface on at lease one side of the microtrench; and
   filling the microtrench with the fill material, wherein the fill mask prevents overfill and/or spillage of the fill material from bonding to the roadway surface or staining the roadway surface. Preferably, application of the fill mask composition to the microtrench is avoided to avoid negatively affecting the bonding between the fill and the microtrench.

BRIEF DESCRIPTION OF THE DRAWINGS

FIG. 6A illustrates a container device having an intake system.

FIG. 9A illustrates an embodiment of spoil transport device.

FIG. 9B illustrates an embodiment of spoil transport device.

FIG. 10 illustrates a marker line.

FIG. 14A illustrates an example of a microtrencher having a utility avoidance device.

FIG. 14B illustrates an example of a microtrencher in which the utility avoidance device has raised the height of the cutting wheel in relation to the roadway to avoid cutting a utility buried under the roadway.

FIG. 14C illustrates an example of a microtrencher having a utility avoidance device connected to the internet.

DETAILED DESCRIPTION OF THE INVENTION

Figure 1:
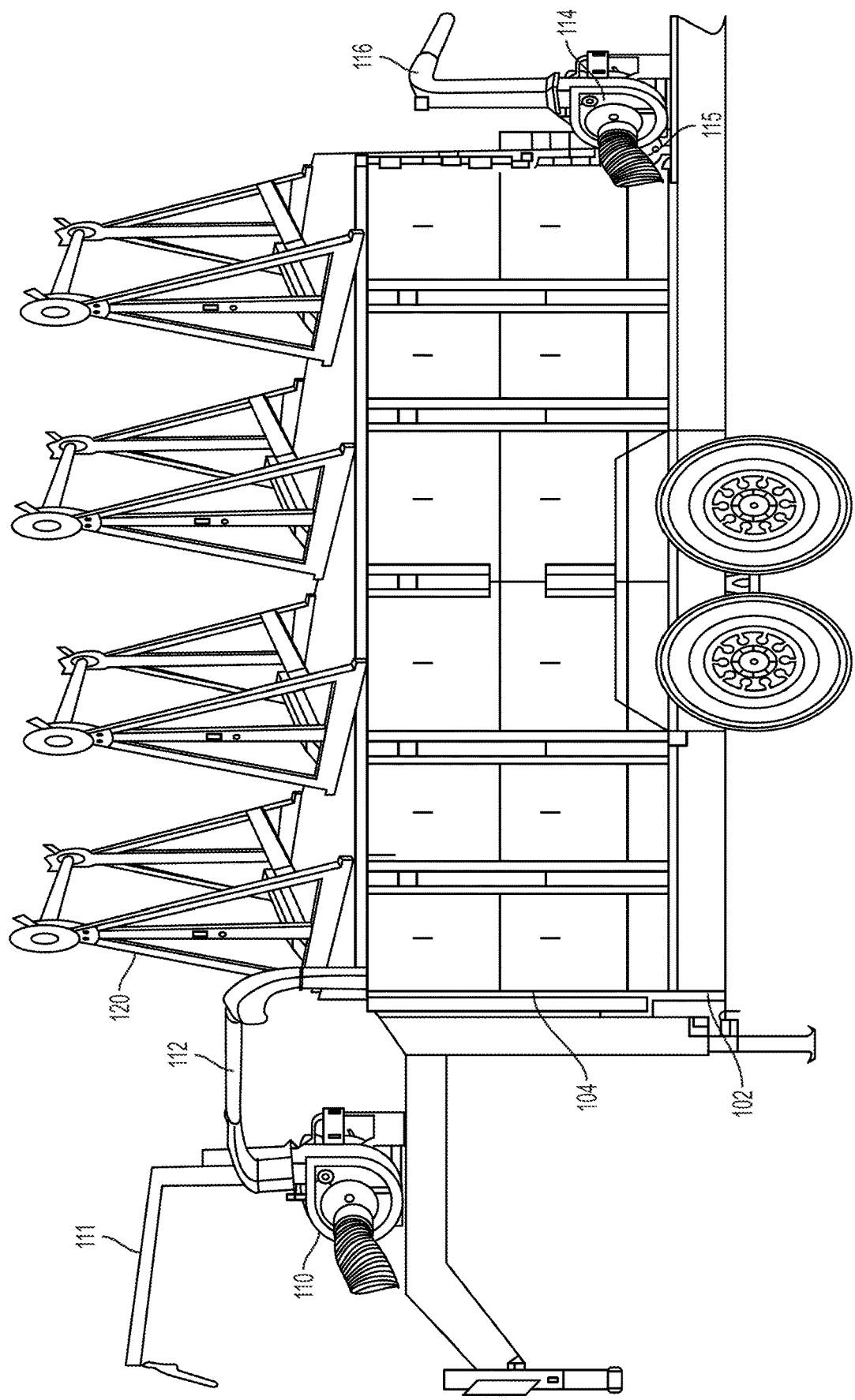
FIG. 1 illustrates a side view of a multifunctional reel carrier, spoil material handling container device.
Figure 2:
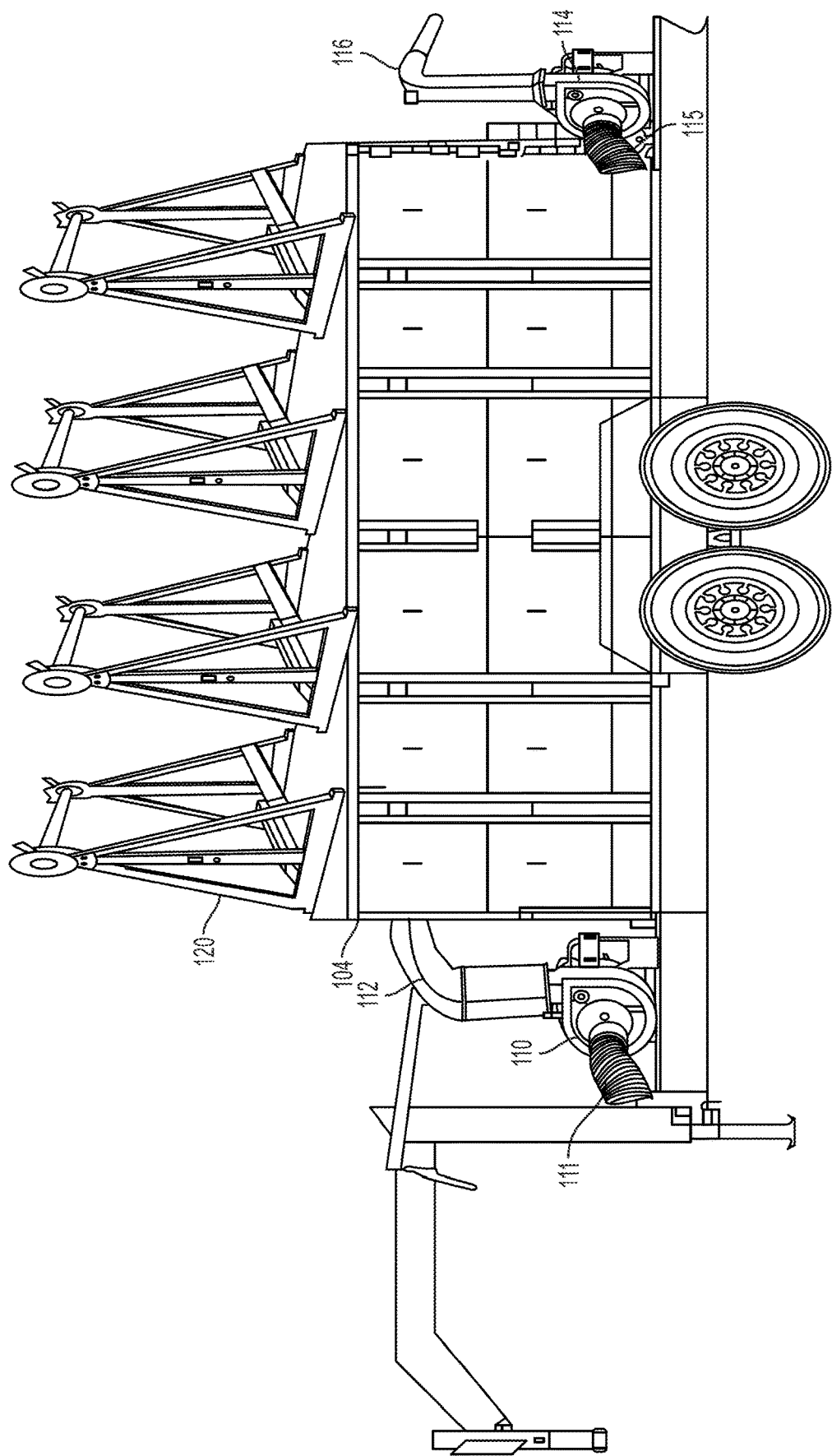
FIG. 2 illustrates a side view of a multifunctional reel carrier, spoil material handling container device.

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention with reference to the attached non-limiting figures.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

As shown in FIGS. 1-4, the multifunctional reel carrier, spoil material handling container device 100 comprises a trader or truck bed 102 so that the multifunctional reel carrier, spoil material handling container device 100 can be moved along with a micro trencher 2. The size of the trailer or bed 102 can be any desired size, for example from 5 to 40 feet. The multifunctional reel carrier, spoil material handling container device 100 includes at least a first container 104 sized to hold spoil 12 created by the saw (such as a cutting wheel) 10 cutting a microtrench 11, for example from 50 to 4,000 cubic feet in size. The first container 104 is constructed to hold the spoil 12. A first vacuum device 110 has an inlet 111 disposed at the micro trencher 2 to suck up the spoil 12, and optionally to also remove spoil 12 from the microtrench 11. An outlet 112 of the first vacuum device 110 deposits the spoil 12 into the first container 104. A second vacuum device 114 has an inlet 115 connected to the first container 104 to remove spoil from the first container 104 and an outlet 116 connected to a fill device 200. Thus, the multifunctional reel carrier, spoil material handling container device 100 is constructed to move spoil 12 from the micro trencher 2 to the first container 104 and then to the fill device 200. Instead of the fill device 200, the second vacuum device 114 can move the spoil to a truck or other vehicle 300 for removal of the spoil from the job site or to recycle the spoil back into the microtrench. The first container 104 has at least one outlet 118 can have a filter to prevent spoil from being ejected into the air. The outlet 118 can allow air to enter or leave the first container 104. The device 100 includes at least one reel holder 120 constructed to hold a reel 121 of cable or innerduct/microduct 140. The multifunctional reel carrier, spoil material handling container device 100 preferably includes a plurality of reel holders 120 that can be adjusted in height and moved manually or mechanically/hydraulically from front to back, back to front, side to side, or up and down. While all of the devices are shown connected together in FIGS. 3-5, the devices can be separate from each other and still operate continuously but unconnected. For example, the optical fiber and or innerduct/microduct 140 can be continuously inserted into the microtrench a time period after the microtrench 11 has been formed and the spoil 12 removed, also the fill device 200 can continuously fill and seal the microtrench 11 a time period after the optical fiber and/or innerduct/microduct 140 has been laid in the microtrench 11.

To facilitate vacuuming of the spoil 12 from the container 104, different methods to move the spoil 12 within the container 104 can be utilized. Examples of suitable methods include, but are not limited to a sloping floor 119 or mechanical moving systems 117 such as augers or conveyors or a tilting mechanism such as a lifting device 129. Alternatively, an inlet moving device 123 for moving an inlet 127 of the vacuum device within the container 104 can be utilized. In another embodiment the outlet 112 can be connected to the inlet 115 using a connection such as a valve.

Figure 7:
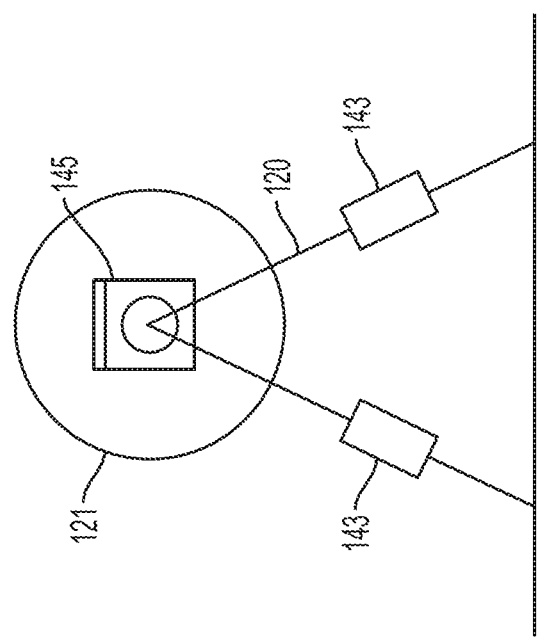
FIG. 7 illustrates a reel.
Figure 8B:
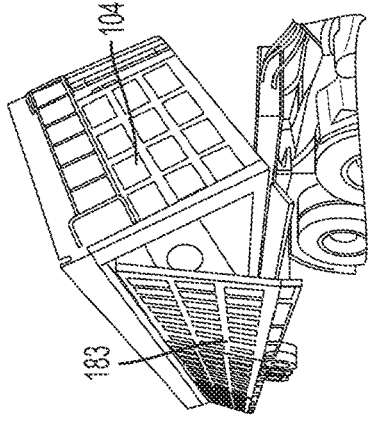
FIG. 8B illustrates an embodiment of the truck 124 showing how the container device can be dumped.
Figure 8E:
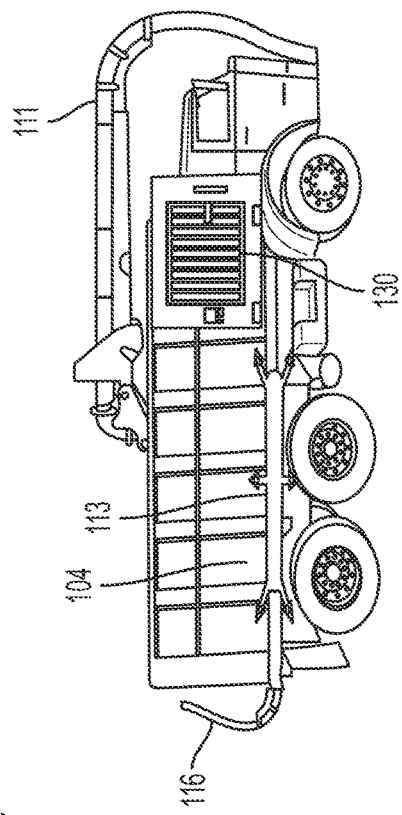
FIG. 8E illustrates an intake system for the container device
Figure 8C:
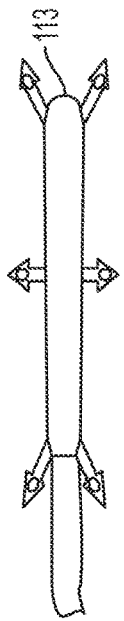
FIG. 8C illustrates an intake system for the container device.
Figure 8A:
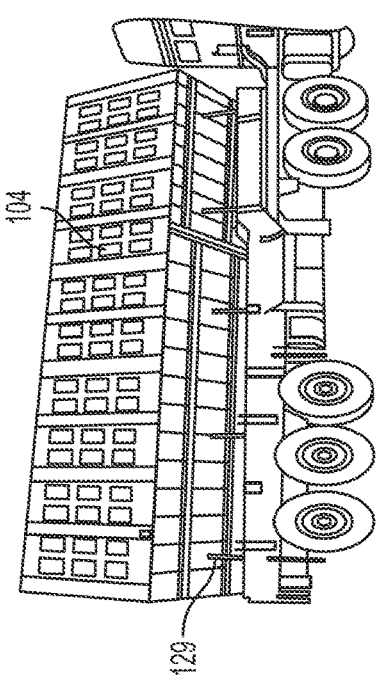
FIG. 8A illustrates an embodiment of the truck 124 showing how the container device can be dumped.
Figure 8D:
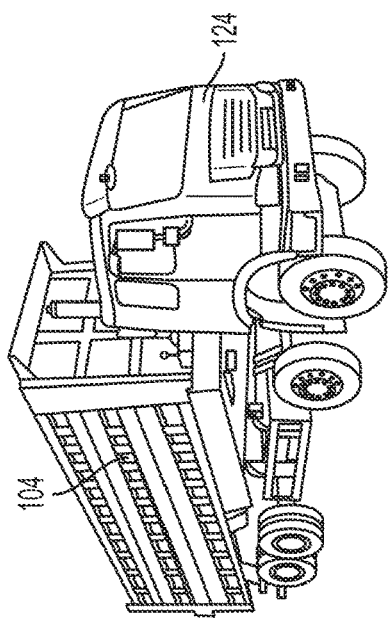
FIG. 8D illustrates an embodiment of the truck 124 showing how the container device can be dumped.
Figure 11A:
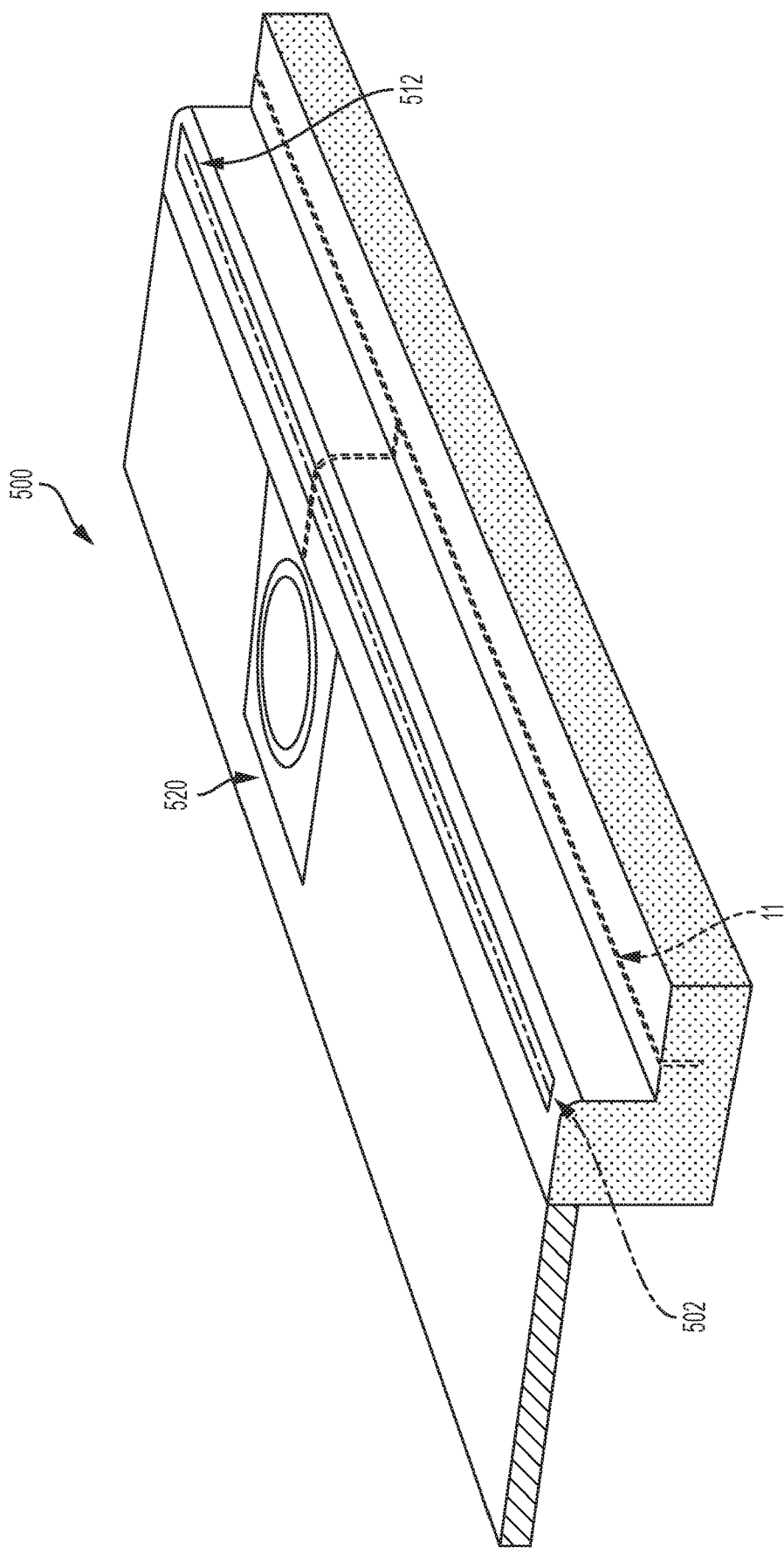
FIG. 11A illustrates a sidewalk and curb having a temporary optical fiber network and micro-trenches cut to move the temporary optical fiber network into a permanent position.
Figure 11B:
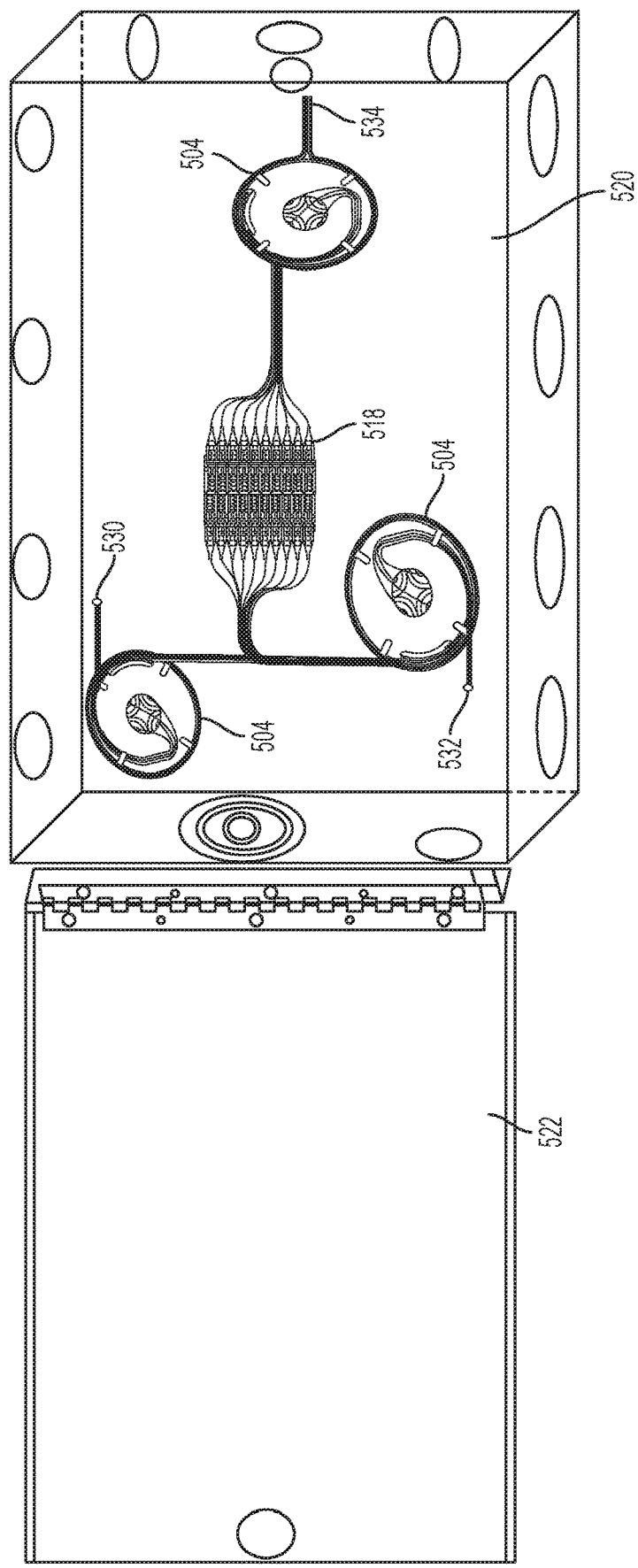
FIG. 11B illustrates a box having optical fiber that can be dispensed as needed.
Figure 11C:
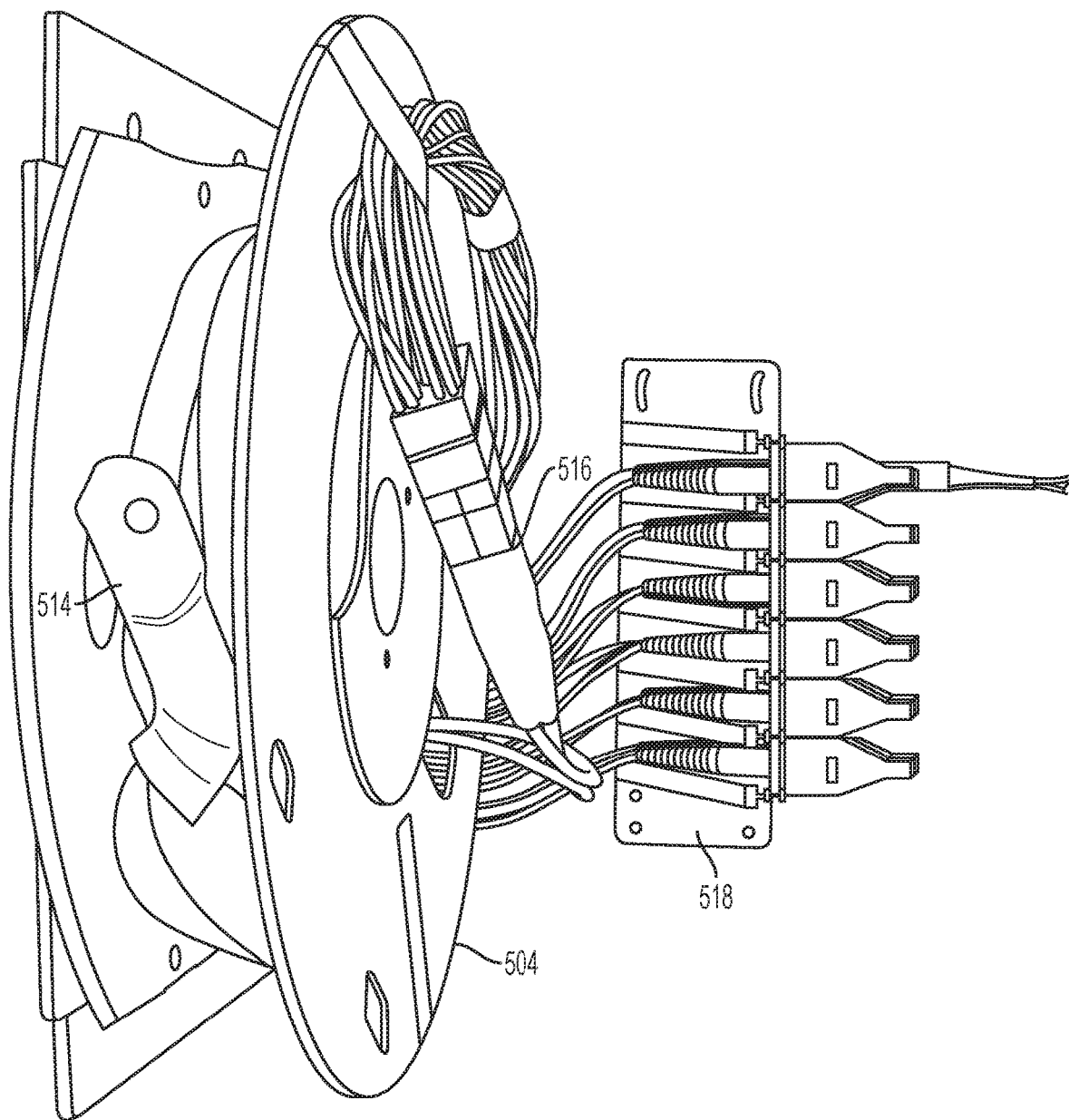
FIG. 11C illustrates a reel of optical fiber connected to a splitter.
Figure 11D:
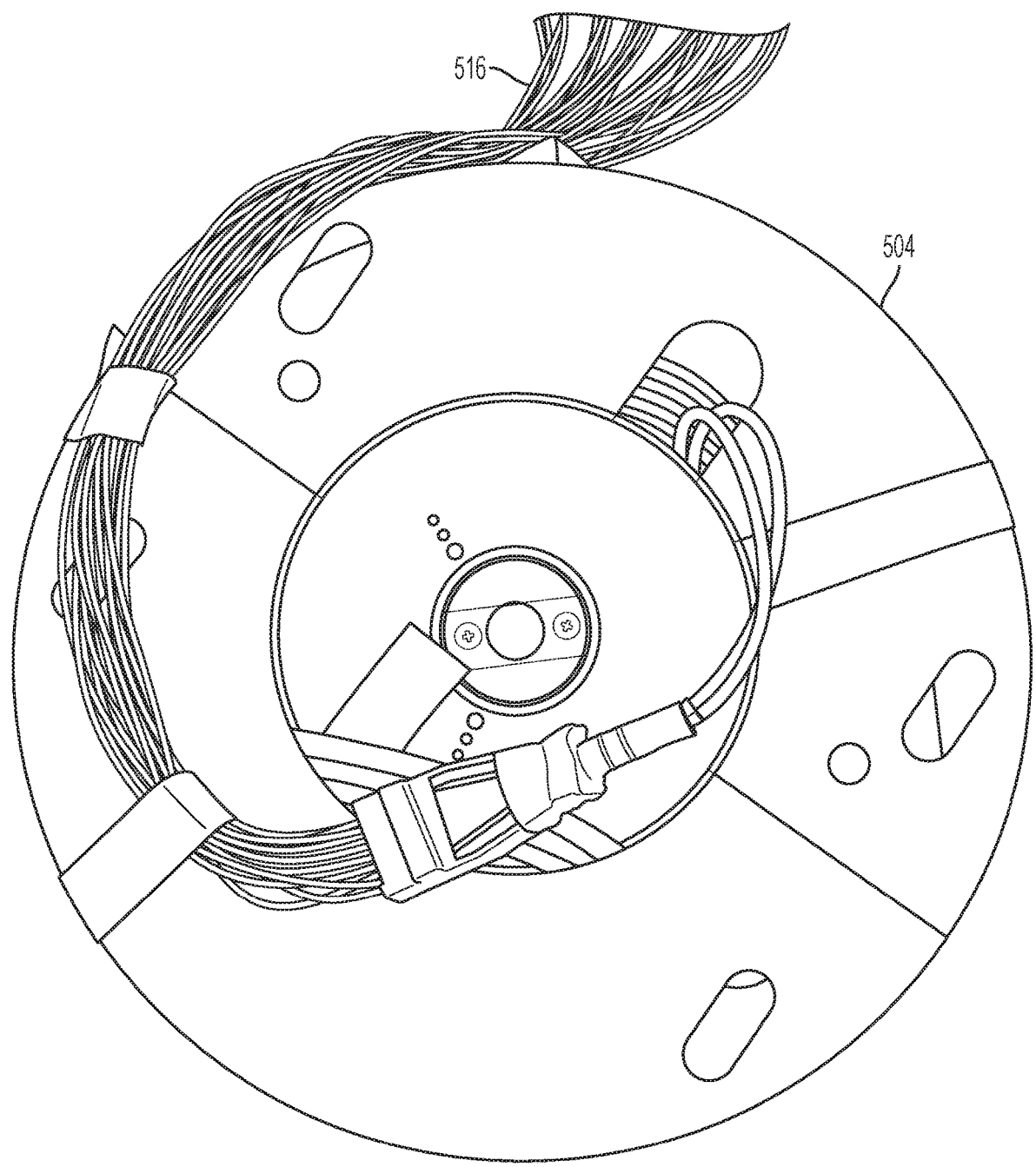
FIG. 11D illustrates a reel of optical fiber connected to a splitter.
Figure 11E:
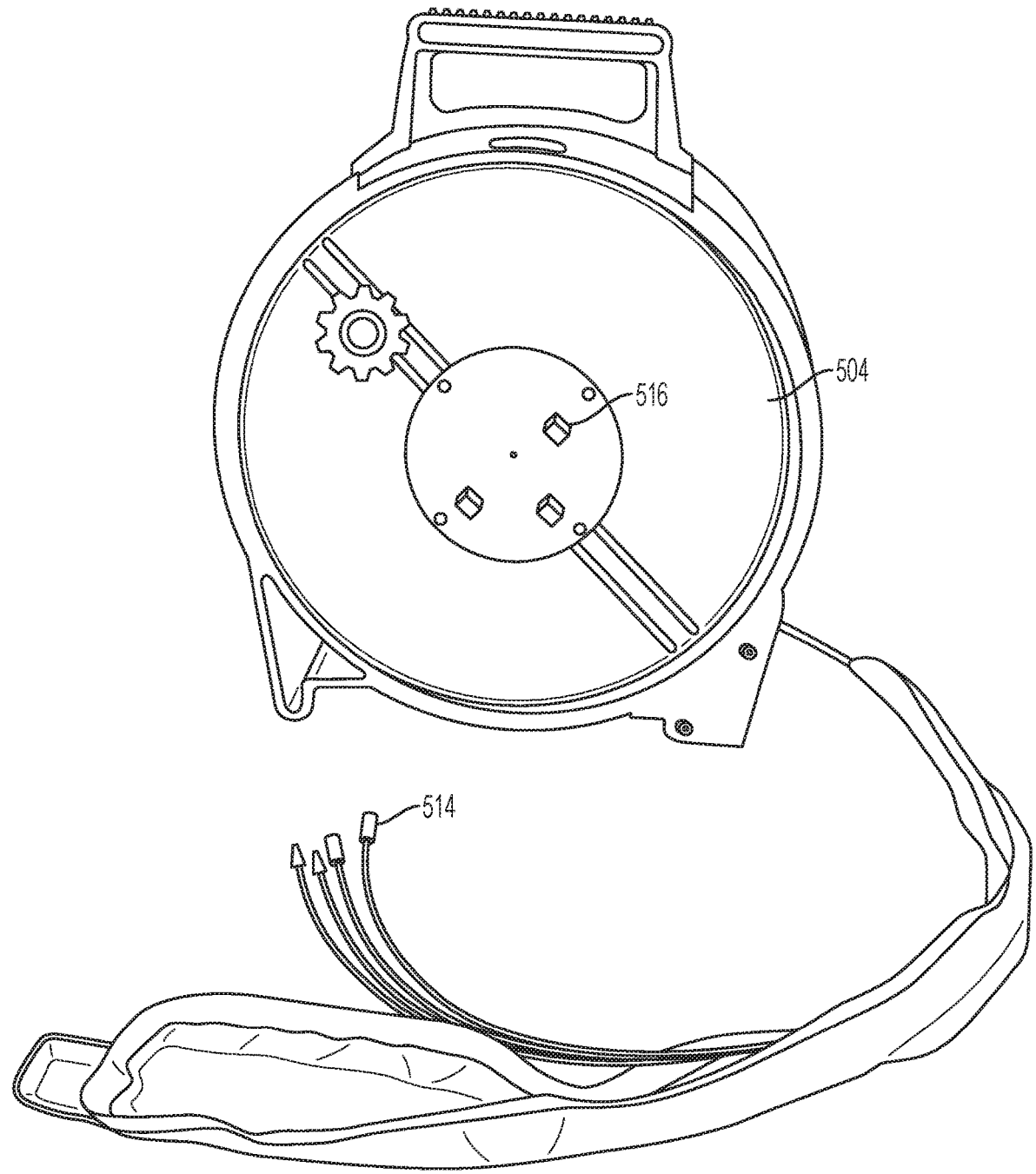
FIG. 11E illustrates a reel of optical fiber.
Figure 11F:
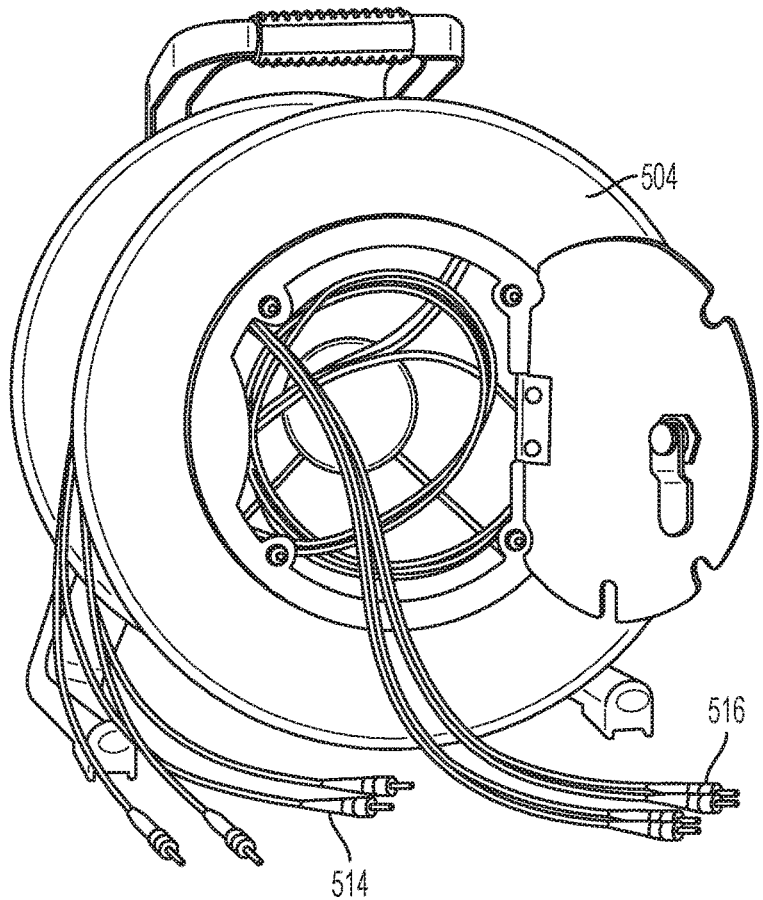
FIG. 11F illustrates a reel of optical fiber.
Figure 11G:
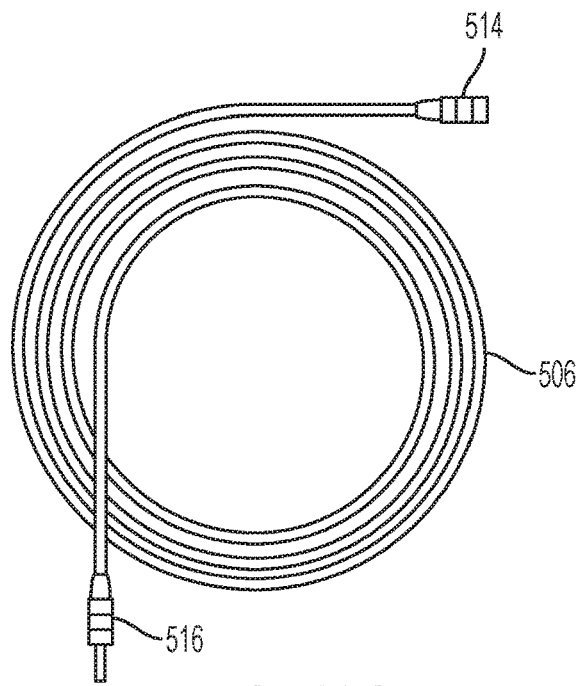
FIG. 11G illustrates a loose coil of optical fiber.

As shown in FIG. 7, the reel holders 120 can be adjustable in height and location either manually or mechanically 143, such as using a tread or locking rail system, to accommodate different size reels. Multiple reel holders 120 can be utilized so that multiple cables and/or innerducts/microducts 140 can be laid in the trench 11 simultaneously. The reel holders 120 can also have manual or mechanical/automatic winding systems 145 allowing the cable, innerduct/microduct 140 to be easily removed from the reels 121 and placed in the trench 11.

Any suitable micro trencher 2 can be utilized in the present invention. Non-limiting examples of suitable micro trenchers include those made and sold by Ditch Witch, Vermeer, and Marais. A micro trencher is a "small rock wheel" specially designed for work in rural or urban areas. The micro trencher 2 is fitted with a saw 10 that cuts a microtrench 11 with smaller dimensions than can be achieved with conventional trench digging equipment. Microtrench 11 widths usually range from about 6 mm to 130 mm (¼ to 5 inches) with a depth of 500 mm (20 inches) or less, Other widths and depths can be used as desired. For example, up to 30 inches deep can be used.

With a micro trencher 2, the structure of the road, sidewalk, driveway, or path is maintained and there is no associated damage to the road. Owing to the reduced trench size, the volume of waste material excavated is also reduced. Micro trenchers 2 are used to minimize traffic or pedestrian disturbance during cable laying. A micro trencher 2 can work on sidewalks or in narrow streets of cities, and can cut harder ground than a chain trencher, including cutting through for example but not limited to solid stone, concrete, and asphalt. The term ground as used herein includes, soil, asphalt, stone, concrete, grass, dirt, sand, brick, cobblestone, or any other material the trench 11 is cut into and the optical fiber buried within.

Figure 4:
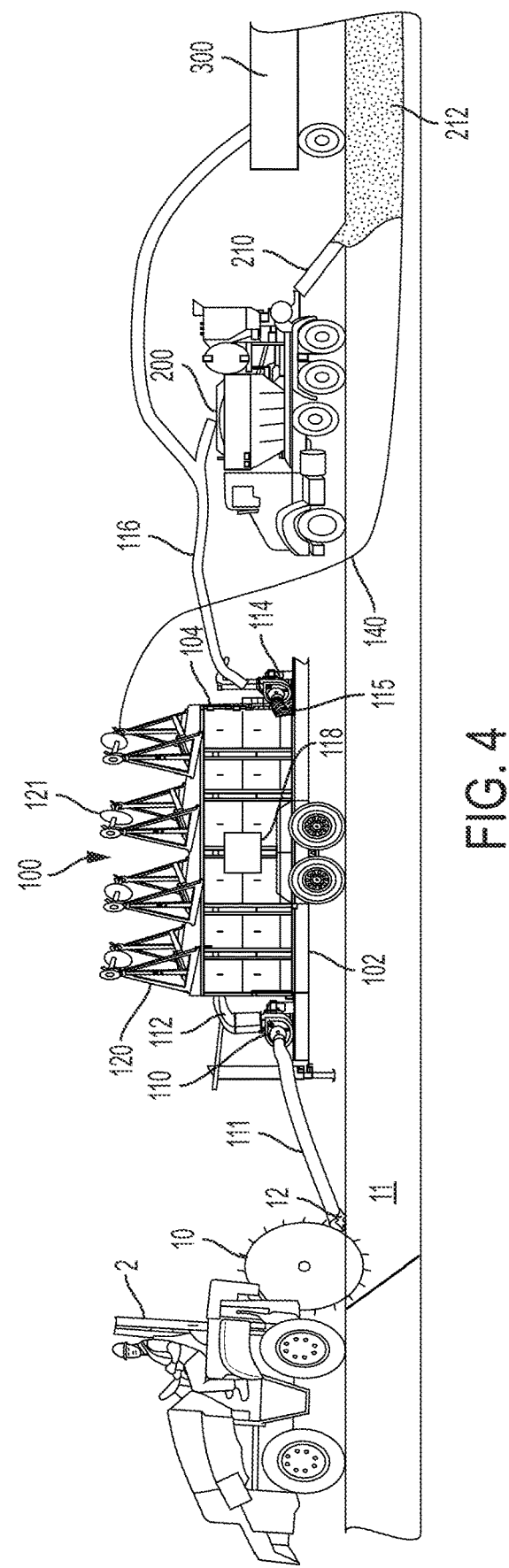
FIG. 4 illustrates a view of the multifunctional reel carrier, spoil material handling container device connected to a micro trencher and a fill device.
Figure 5:
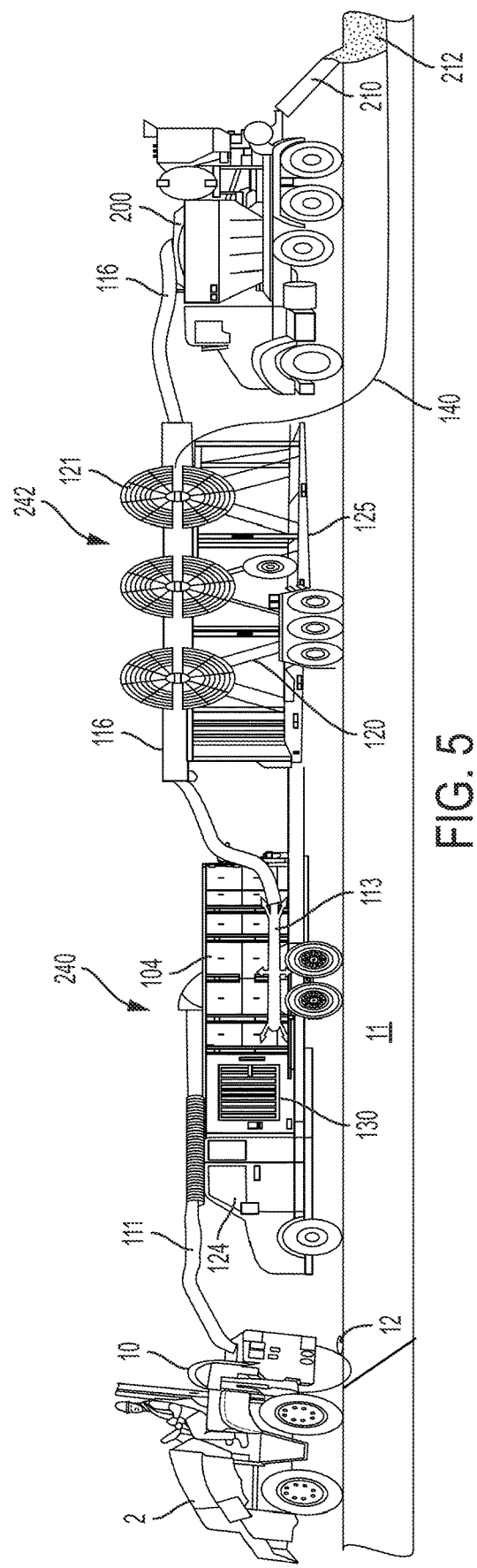
FIG. 5 illustrates a view of another embodiment of the multifunctional reel carrier, spoil material handling container device connected to a micro trencher and a fill device.
Figure 6B:
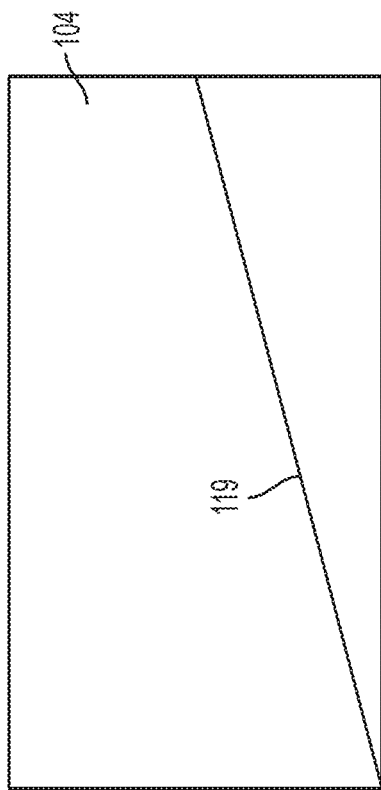
FIG. 6B illustrates a container device having a sloping floor.
Figure 6C:
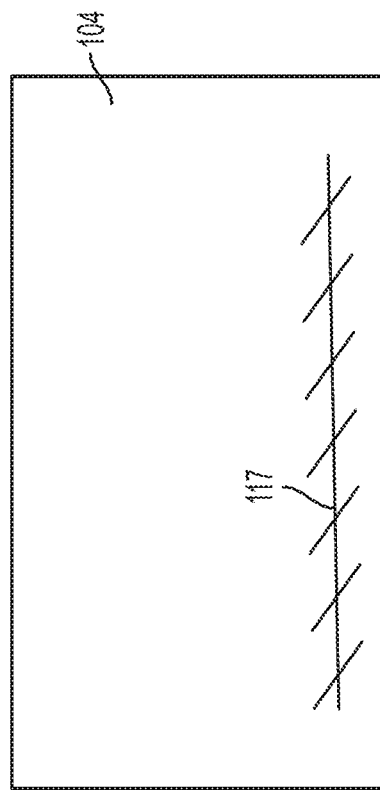
FIG. 6C illustrates a container device having a mechanical moving system.
Figure 6D:
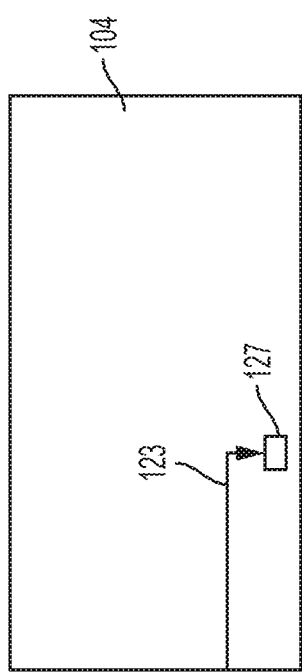
FIG. 6D illustrates a container device having a moving inlet device.
Figure 6E:
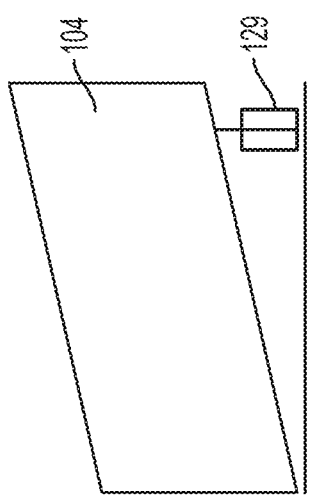
FIG. 6E illustrates a container device having a dump body.

FIG. 5 shows another exemplary embodiment of the present invention. A micro trencher 2 is used to cut a micro trench 11. The multifunctional reel carrier, spoil material handling container device 100 is separated into a container carrier device 240 comprising a truck 124 and reel carrier device 242 comprising a trailer 125 so that the container carrier device 240 and reel carrier device 242 can be moved along with a micro trencher 2. The trailer 125 can be a separate truck if desired instead of a trailer. The container carrier device 240 includes at least a first container 104 sized to hold spoil 12 created by the saw 10 cutting a microtrench 11. The first container 104 is constructed to hold the spoil 12. A vacuum device 130 has an inlet 111 disposed at the micro trencher 2 to suck up the spoil 12, and optionally to also remove spoil 12 from the microtrench 11. The inlet 111 comprises a hose. The inlet 111 can be connected to the container 104 and the vacuum device 130 connected to the container 104 so that when a vacuum is pulled on the container 104, the spoil 12 is sucked through the inlet 111 into the container 104. In this instance, the container 104 can be constructed to substantially maintain its shape when a vacuum is pulled. A safety valve can be present to prevent too much of a vacuum being pulled on the container 104. Alternatively, the inlet 111 can be connected to the vacuum device 130 and the spoil deposited into the container 104. The vacuum device 130 has an intake system 113 or inlet 127 inside the container 104 to suck up spoil 12 inside the container 104. An outlet 116 of the vacuum device 130 transfers the spoil 12 to the fill device 200 or to another vehicle 300 as shown in FIG. 4. Alternatively, the truck 124 can be fitted with two vacuum devices 110 and 114 as shown in FIG. 4 in place of the single vacuum device 130. Thus, the container carrier device 240 is constructed to move spoil 12 from the micro trencher 2 to the first container 104 and then to the fill device 200. The reel carrier device 242 comprises at least one reel holder 120.

As shown in FIGS. 6A-6E, the container 104 can be any desired shape, such as square, rectangular, or tubular and hold anywhere from 1 cu yard of spoil to 100 yds of spoil 12. The spoil intake, inlet 111, can be any desired location on the container 104, such as on the top, back, front or side of the container 104 or connected to the container 104 via the vacuum 110 or 130. Spoil removal intake system 113 or inlet 127 can be located in any desired position in the container 104, such as on the bottom, side, front or rear. The intake system 113 can have one large opening or multiple smaller openings spread out to remove the spoil 12 evenly from the container 104. The container 104 can have an opening and a lifting device 129, such as hydraulics, to lift or tilt the container 104 to move the spoil within the container 104 or to remove the spoil from the container. For example, the container 104 can be part of dump truck. Thus, the container 104 can have the ability to off load spoil 12 by tilting to either side to dump the spoil 12 through a door 183 or can be raised, expelling the spoil 12 from the rear. The side wall(s) and or back of the container 104 can be locked manually or hydraulically to ensure no spoil 12 or dust can leak out during the vacuum intake or outtake process. A fill gauge 160 can be installed showing how full the container 104 is. An air valve 163 can be installed to adjust the air pressure inside of the container 104, such as allowing air to be removed during and after operation when spoil 12 passes through the vacuum device and then into container 104 as shown in FIG. 4, or to allow air into the container 104 to prevent too low of a vacuum in the container 104 when the spoil 12 is sucked directly into the container as shown in FIG. 5. An air filter 167 can be installed allowing air to be released reducing pressure build up in the container 104 while containing dust inside of the container 104. Pressure gauge 161 can be installed to monitor the pressure in the container 104. The interior of the container 104 can have a stationary slant in the bed 119 or a mechanical moving system 117 to help move the spoil 12 to a designated release point.

A conventional vacuum truck can be modified to remove spoil 12 from the container 104 by adding the intake system 113, adding an outlet 116 to fill device 200, and modifying the vacuum device 130 and/or adding an additional vacuum device to transfer spoil 12 from the saw 10 to the container 104 and to the fill device 200. FIGS. 8A-8E illustrate a modified vacuum dump truck 124.

The multifunctional reel carrier, spoil material handling container device 100 (FIG. 5) and the reel carrier 240 (FIG. 4) can each includes at least one reel holder 120 constructed to hold a reel 121 of cable or innerduct/microduct 140. The multifunctional reel carrier, spoil material handling container device 100 and the reel carrier 240 each preferably includes a plurality of reel holders 120 that can be adjusted in height 143 and moved manually or mechanically/hydraulically from front to back, back to front, side to side, or up and down. To reduce the overall height of the device, the reel holders 120 can be mounted on a separate trailer 125 that is towed by the truck 124.

The first vacuum device 110 and second vacuum device 114, and vacuum device 130 are constructed to suck up and expel the spoil. Commercial examples of suitable vacuum devices 110, 114, 130 are those made by SCAG Giant Vac., DR Power, and Billy Goat. The inlets 111, 115, 127 and outlets 112, 116 of the vacuum devices can be conventional hoses, such as 4 to 16 inch diameter hoses. The vacuum devices 110, 114 can also have a water misting system 148 that is attached to a water tank 150. The misting system 148 can be engaged manually or electronically programmed to emit a water mist inside the container 104 minimizing dust. The vacuum devices 110, 114, 130 can run on gas, diesel, electric or solar power. The vacuum devices 110, 114, 130 can have a steel impeller inside that will allow for any debris to be pulverized or chopped into smaller pieces. The vacuum devices 110, 114, 130 can be mounted on a truck or can be on a trailer and hitched to a vehicle for transportation. The vacuum devices 110, 114, 130 can be hooked up directly to a vehicle gas tank in order to eliminate a separate fueling mechanism. The vacuum fuel tank can have its own independent gas tank fueling mechanism. If one vacuum is used to do both intake and outtake, a secondary outtake valve 156 can be used for the spoil to be expelled. The intake valve 154 may need to be closed or shut off so no spoils will be expelled out of the saw connection. The intake system 113 can also have a valve 152 for controlling the amount of spoil 12 to be removed from the container 104. The vacuum can have a CFM (cubic feet per minute) throttle allowing the intake and outtake speeds to be adjusted based on the operator's requirements.

Figure 3:
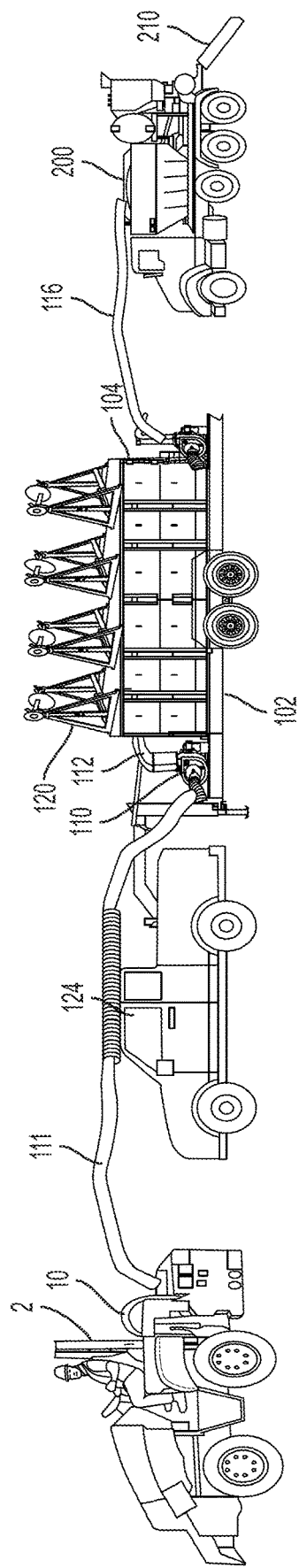
FIG. 3 illustrates a view of the multifunctional reel carrier, spoil material handling container device connected to a micro trencher and a fill device.

The present invention also relates to a continuous method of cutting a microtrench 11, laying cable and/or innerduct/microduct 140 in the microtrench 11, and then filling and sealing the microtrench 11 in one step (also referred to as one pass) with the fill 212. An exemplary method is shown in FIGS. 3 and 4. A micro trencher 2 is used to dig a trench 11 and create spoil 12. The first vacuum device 110 is used to vacuum the spoil 12 from the microtrencher 2, preferably also from the trench 11, and deposit the spoil 12 in the first container 104. Cable or innerduct/microduct 140 is spooled from the reel 121 and laid in the trench 11. A fill device 200 is then used to fill the trench 11 with fill 212 from an outlet 210 to cover the cable or innerduct/microduct 140. The second vacuum device 114 can be used to vacuum at least a portion of the spoil 12 from the first container 104 and transfer the spoil 12 to the fill device 200 to form the fill 212 from the spoil 12. The trench can be filled with one or more of the following examples, but not limited to, cement, grout, sand, self-leveling sealer, expansion joint, epoxy which is inserted into the trench on top of the cable or innerduct/microduct.

A further exemplary method is shown in FIG. 5. A micro trencher 2 is used to dig a trench 11 and create spoil 12. The vacuum device 130 is used to vacuum the spoil 12 from the micro trencher 2, preferably also from the trench 11, and deposit the spoil 12 in the first container 104. Cable or innerduct/microduct 140 is spooled from the reel 121 and laid in the trench 11. A fill device 200 is then used to fill the trench 11 with fill 212 from an outlet 210 to cover the cable or innerduct/microduct 140. The vacuum device 130 can be used to vacuum at least a portion of the spoil 12 from the first container 104 and transfer the spoil 12 to the fill device 200 to form the fill 212 from the spoil 12.

One or more spoil transport devices are utilized in the present invention to transfer spoil from the micro trencher 2, and optionally also the trench 11, and move the spoil 12 to first container 104, fill device 200, trucks, and/or any other devices utilized in the present invention. FIGS. 1-8 illustrate embodiments of the spoil transport devices comprising vacuum devices, as discussed above. Instead of vacuum devices, the spoil transport devices can be a conveyor 301, a screw 302, or any other spoil moving device as shown in FIGS. 9A and 9B. Preferably, the spoil transport device for removing spoil from the micro trencher 2 and trench 11 comprises a vacuum device.

A particularly preferred flowable concrete-based fill 212 can be formed by mixing together a bonding agent comprising a polymer additive (polymer bonding agent), concrete mixture (cement and aggregate) and a coloring agent to complete the micro trench or shallow trench backfilling operation. The spoil 12 can be used as part of the flowable concrete-based fill 212. A preferred commercial example of the polymer bonding agent is SC polymer by SureCrete, which can be found at https://www.surecretedesign.com/product/liquid-conrete-polymer/. Examples of the polymer bonding agent include latex modified bonding agents, acrylics, epoxies, styrene-acrylics, vinyl acetate ethylene (VAE), polyvinyl acetate (PVA), and styrene-butadiene resins (SBR). In liquid form, polymer bonding can be supplied in two parts, liquid and powder, to be mixed together prior to use. In dry form, the polymer bonding agent can be pre-packaged with desired materials blended for specific applications. A preferred polymer bonding agent is an acrylic polymer. The polymer bonding agent can be added to the flowable concrete-based fill 212 in conjunction with substituting sand and/or spoil for conventional gravel aggregate to allow for use in the micro trench or shallow narrow trench application. By altering the slump or viscosity of the concrete by altering the water content we were able to control the flow rate and application of the mixture into the narrow trench. There are other commercially available bonding agents that will perform similar the product above. Polymer bonding agents for concrete are well-known in the art and any desired polymer bonding agent can be utilized to increase the bond between the set fill and the roadway in the microtrench.

One of ordinary skill in the art will be able to adjust the viscosity of the bonding agent/concrete mixture fill 212 so that the fill 212 can flow into the shallow narrow trench, such as less than 2" in width and from 2" to 20" in depth.

In comparison, previous to the present polymer bonding agent/concrete mixture, we used concrete mixtures or asphalt mixtures as the primary backfill in the trench and then a chemical compound was utilized over top of the mixture to seal the roadway from water intrusion. By using the concrete with the bonding agent in the trench we have eliminated the need for multiple passes as the bonding agent will bond to the trench and provide the necessary seal to the roadway, i.e. the entire fill provides a seal to the existing roadway inside the microtrench. The chemical compounds utilized previously in sealing the trenches are costly, slow to deploy in some cases, and was required installation crews to complete multiple steps in completing an operation. Furthermore, by coloring the bonding agent/concrete mixture to match the roadway color we have further reduced the cost of installation by completing the backfill in one step and the coloring is similar to that of an existing roadway. The bonding agent provided the adhesion to the existing surface which in the past was completed with different much more expensive chemicals. The bonding agent/concrete mixture allows for the installation of a cement based product with adhesive characteristics. Filling a microtrench in one step using a color matched bonding agent/concrete mixture instead of multiple steps has not been done heretofore.

By pumping or using commercially available concrete installation tools, substituting sand and/or spoil for conventional stone aggregate, regulating the viscosity of the concrete product by adjusting the water content, adding the coloring agent to the concrete, and adding a bonding agent, we have developed a method of completing the shallow narrow trench that is far faster and significantly more cost effective than prior solutions that are utilized in the industry. This allows for significant cost savings compared to other methods of backfilling a shallow narrow trench.

The figures show exemplary devices for practicing the claimed invention that are now being used by the inventor to install optical fiber cable for Google. The present invention allows surprisingly far faster and more efficient installation of the optical fiber. For example, our multiple crews installing optical fiber cable for Google are installing from 4000 to 6000 feet of optical fiber cable per day. We believe up to 7000 feet per day can be achieved. Conventional methods only allow about 1000 feet per day. The present invention causes far less disruption of roads and pathways. The present invention can also return the roads and pathways to their original state with the same colored fill. The present invention is not limited to the order of the devices and methods illustrated in the figures and any desired order of devices and steps can be utilized to practice the claimed invention.

In another embodiment, a marker line 400 as shown in FIG. 10 can be applied to the surface 402 of the ground to be cut by the micro trencher. In this manner, utilities can see where the micro trench 11 will be formed so that the utilities can mark locations of their infrastructure 410, such as electrical lines, optical cable, water lines, sewer lines, or any other infrastructure. The marker line 400 can have start 406 and stop 408 locations, and can identify the depth. The marker line 400 can be a solid line, dashed, dotted, contain letters, numbers or symbols, and can be any desired color with white being the most preferred.

In another embodiment of the invention, a temporary fiber optic cable network can be laid out on the surface and utilized as a temporary optical fiber network. The temporary optical fiber network can be protected with any desired protection device, such as conduit, tarps, tape or other type of cover, that can be skid proof, and constructed for outdoor use which can withstand foot and vehicle traffic. For example, the tape can be heated to activate an adhesive, or peelstick, silicone, epoxy glue or any desired type of adhesive. The surface can be a street, sidewalk, driveway, asphalt, concrete, dirt, interior floor, or any other desired surface.

As shown in FIGS. 11A-11G, the temporary optical fiber network 500 includes at least one optical fiber cable 502, and preferably a plurality of optical fiber cables 502. The optical fiber cables 502 can be coiled on a reel 504 or loosely coiled 506. Each end of the optical fiber cables 502 can have a first connector 514 installed thereon, or a connector can be installed in the field by a technician. The optical fiber cable 502 can be uncoiled to a desired distance and a protection device 512, such as tape, applied thereover. A first end of the optical fiber cable 502 can be connected to a desired feed using the first connector 514. The second end of the coil can be connected to any desired location using the second connector 516. The connectors 514, 516 can be connected to splitters 518 or any desired device. The desired location can be dwelling, sporting event, military site, or any other desired location.

The reel 504 and loose coil 506 allows the fiber cable 502 to be deployed to any desired length and also to be recoiled if necessary. The second end connector 516 can be constructed so that the second end connector 516 can remain connected while the reel 504 is rotated, similar in design to the Camplex reels. Alternatively, the second end connector 516 can be disconnected while the reel 504 is rotated so that the connector 516 can rotate with the reel 504. The loose coil 506 or wound reel 504 can be installed within a box 520. The box 520 can contain multiple reels 504 or coils 506. The box 520 can be formed from plastic, metal, galvanized, stainless steel, concrete, fiberglass, rubber or any other suitable material. The reels 504 can be mounted on bracket(s) or rod(s) 522 that can be placed from side to side (horizontal) or from bottom to top (vertical). Spacers can be placed in between the reels so they can spin independently of each other. The box 520 can have any desired shape, such as tubular, square, triangular, rectangular or any other desired shape. The box 520 can have a lid or door that can be locked or otherwise secured. The box 520 can be mounted on a roller. The box 520 can be buried, mounted pole, or secured in any desired location.

The box 520 can have one or more optical fiber extenders, such as reels 504 or loose coils 506, for input 534 to allow optical fiber cable 502 to be unwound for a temporary or final installation. The box 520 can have one or more optical fiber extenders, such as reels 504 or loose coils 506, for output 532 to allow optical fiber cable 502 to be unwound for a connection(s) to and additional box(es) 520 for temporary or final installation. The box 520 can have one or more optical fiber extenders, such as reels 504 or coils 506, for fiber drops 530 to allow optical fiber cable 502 to be unwound for connections to customers for temporary or final installation.

After using the temporary optical fiber network 500, once the desired location of the optical fiber 502 and box(s) 520 are known, the optical fiber network can be made permanent by removing the protection device 512, creating slack in the optical fiber 502 by uncoiling the optical fiber from the extenders in the box 520, creating a microtrench as described herein, burying the optical fiber and covering the optical fiber with a fill, and permanently mounting or burying the box(s) 520.

Fiber optic converter/extenders on a 1000 foot reel are known. Commercial examples are cmx-tacngo-sdi tac-n-go 3G sdi fiber optic converter/extender, TAC1 Simplex LC fiber optic tactical cable reel, and Tac-N-Go fiber optic by Camplex. www.camplex.com. These are field deployable optical fiber reel systems. Corning systems also provides fiber optic convert/extenders at any desired length, any number of connectors, such as 1 strand to 864 strands, usually from 6 strands to 432 strands, and the fiber optic cables can be connectorized in field or already have a connector applied. The known reels can be utilized in the present box 520 and permanently mounted.

The temporary taped optical fiber installation can be utilized to provide an optical fiber network 500 to a desired user, such as a neighborhood, business, sporting event, military complex, or any other desired location. Once the desired location of the optical fiber is determined, slack can be provided in the optical fiber 502, the tape 512 removed, a nanotrench or microtrench 11 can be formed, the optical fiber 502 installed in the microtrench 11, and then the microtrench 11 can be filled 212 using any desired method, such as the methods described herein above. Instead of the microtrench 11, the optical fiber can be mounted in conduits, drills, core drill, hung, walls, hydrovac, and/or directional drill. If the optical fiber 502 is on a reel 504 within the box 520, the box 520 and reel 504 can be permanently mounted. In addition to the fill 212 described above, the buried fiber cable 502 can be covered with self leveling grout, caulking, asphalt, tar, SL1, cold patch, concrete, sterling Loyd, of other fill products.

The fill 212 can be covered with a spray on waterproofing sealer. A preferred example is the TRANSLINE SOLVENT-BASED SOLID COLOR WATERPROOFING SEALER AND TREATMENT—BLACK developed as a modification to the Black Gorilla Paint, 22A-E001, to help with spraying the material easier. The TRANSLINE SOLVENT-BASED SOLID COLOR WATERPROOFING SEALER AND TREATMENT—BLACK can be changed to the same formula as the Black Gorilla Paint, 22A-E001. Alternatively, the Black Gorilla paint can be utilized.

The present invention includes a system, method and device for connecting a fiber optic cable 502, by the second connector 516, to a feeder line that supplies one or more signal types, such as television (TV), data (e.g., internet access), and telephone (fixed wireline or cellular), to a plurality of units (offices or dwellings) in a multi-unit building. In some example embodiments, the system, method and device may be used to connect a fiber optic cable 502 to existing internal wiring (twisted pair, coaxial cable, etc.). In addition or alternatively, the device can be used to connect a feeder line to a wifi, local network, telephone network, or any other desired connection within the building. The invention can also be used to supply a neighborhood. For example, if coax is already connected to an existing neighborhood, the coax can be connected to cards in a box and an optical fiber cable 502 can used to input a feeder line into the input 534 of the box 520 so that coax does not have to be replaced saving considerable time and expense. In this manner the box can be placed on a telephone pole or near an optical fiber connection so that and optical fiber cable 502 input can be connected to the multiple existing coax cables.

Specifically, in many buildings it may be cost prohibitive and/or impractical to run fiber optical fiber cable 502 to each unit. In addition, the various owners of units may want to purchase services that require different drop connections (i.e., the wiring (twisted pair, fiber, coax, etc.) that connects the unit to the feeder line using optical fiber cable 502. In addition, it may be more economical to use an existing drop connection (e.g., twisted pair) for some services (e.g., telephone). For example, one dwelling unit may purchase only telephone service (which may employ a twisted pair drop connection), another dwelling unit may purchase telephone and television service (which may employ a coaxial cable or coax cable and twisted pair drop connection), and yet another dwelling unit may purchase only internet access (which may employ a fiber conductor or coaxial cable drop connection). Embodiments of the present invention may be used to service buildings to supply service to units using any of various media including twisted pair, coaxial cable, fiber optics, CAT-5 (Ethernet), and/or others. The disclosure in my previous U.S. Pat. No. 9,485,468 is incorporated herein by reference.

While the device for cutting a microtrench device is preferably utilized to bury the temporary optical fiber network, any trenching device can be utilized. For example, the trench can be ⅛ inch to 1.5 inch wide and up to 6 inches deep when using the microtrenched, or 0.75 to 3 inches wide, and as deep as 24 inches for larger trenching devices.

Figure 12:
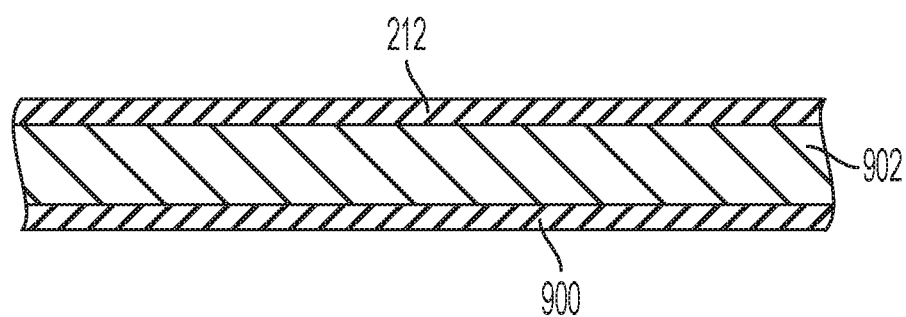
FIG. 12 illustrates a device identifier fill over a buried device.
Figure 13:
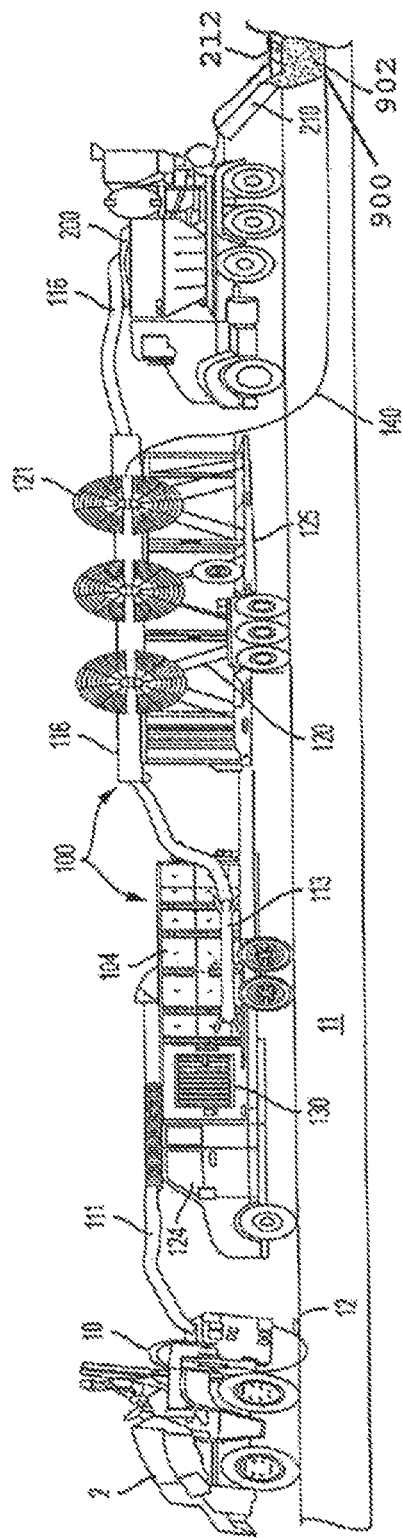
FIG. 13 illustrates a device for applying the device identifier fill.
Figure 15:
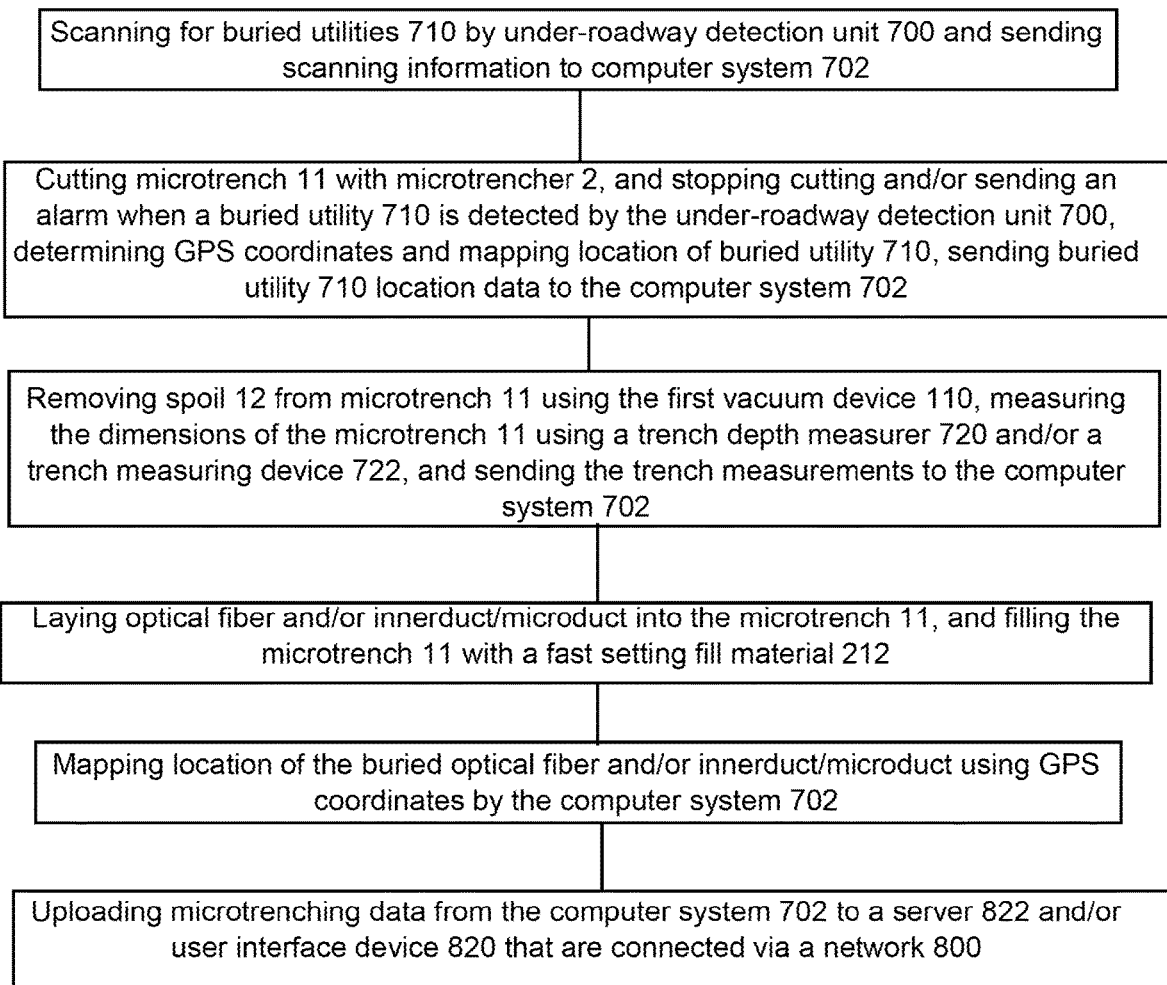
FIG. 15 illustrates a flow chart of an example of the continuous microtrenching method.
Figure 16A:
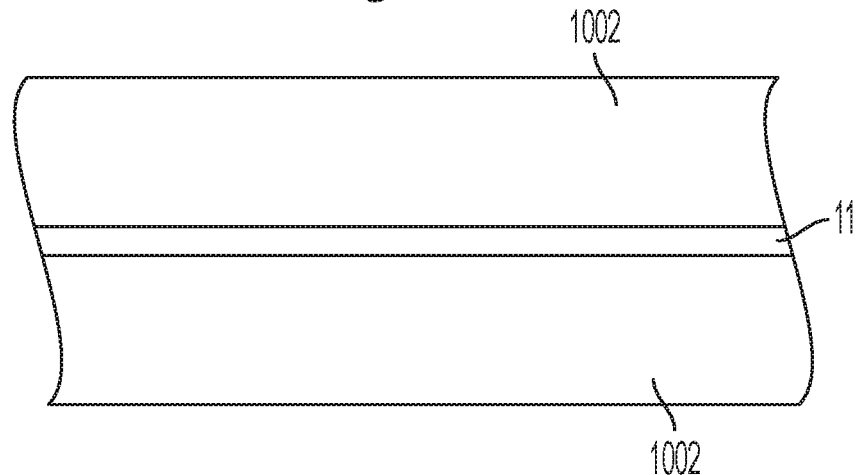
FIG. 16A illustrates a top view of an example of a fill mask.
Figure 16B:
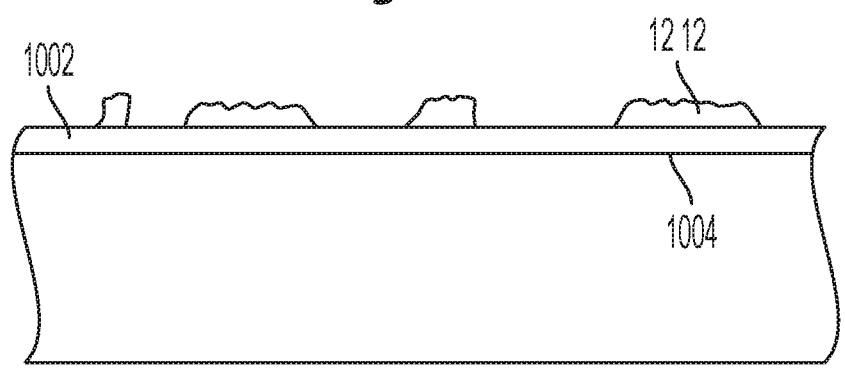
FIG. 16B illustrates a side view of an example of a fill mask having fill spillage and/or fill overfill on the fill mask.
Figure 16C:
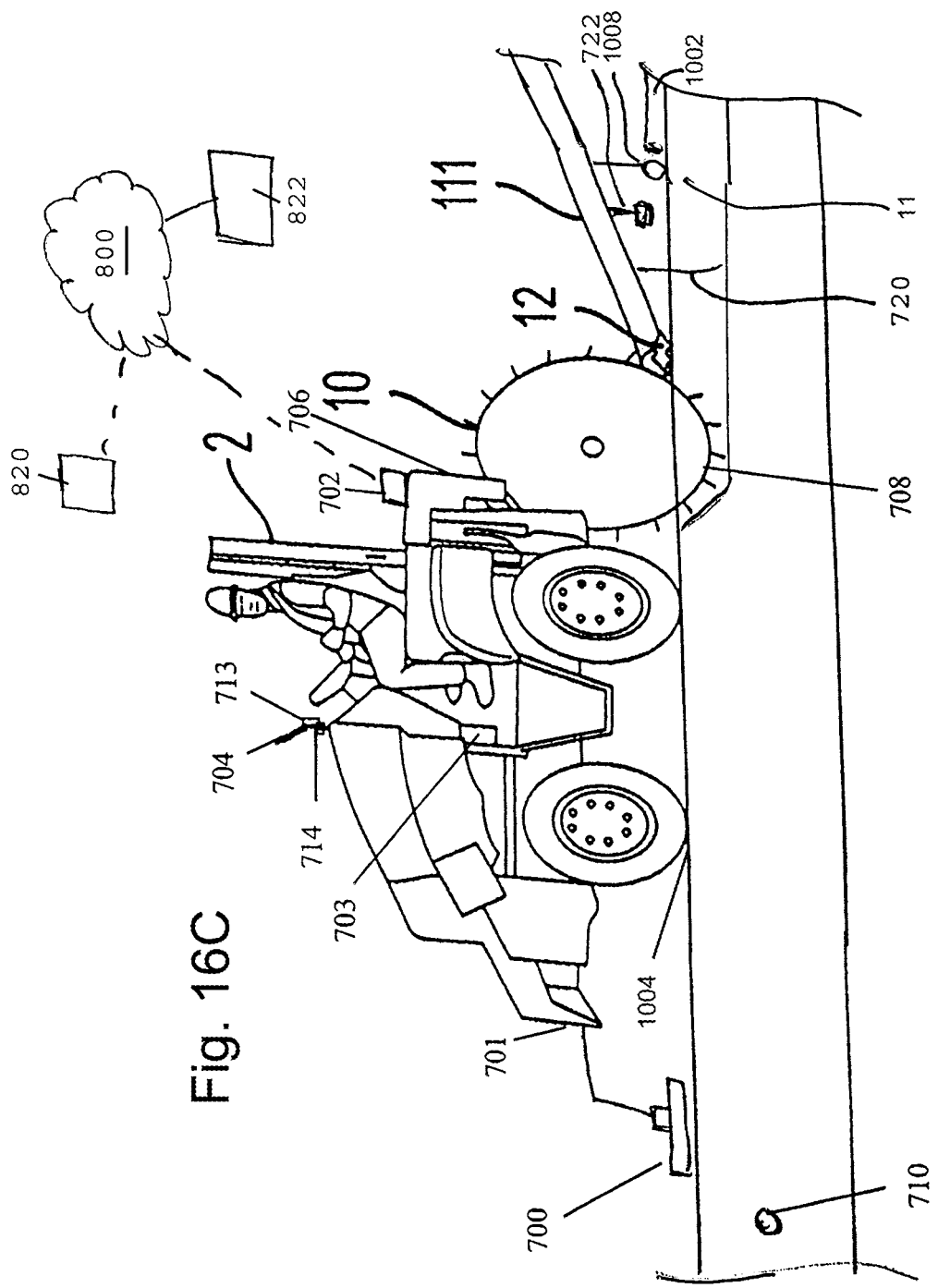
FIG. 16C illustrates a view of a fill mask being applied using a paint roller.
Figure 16D:
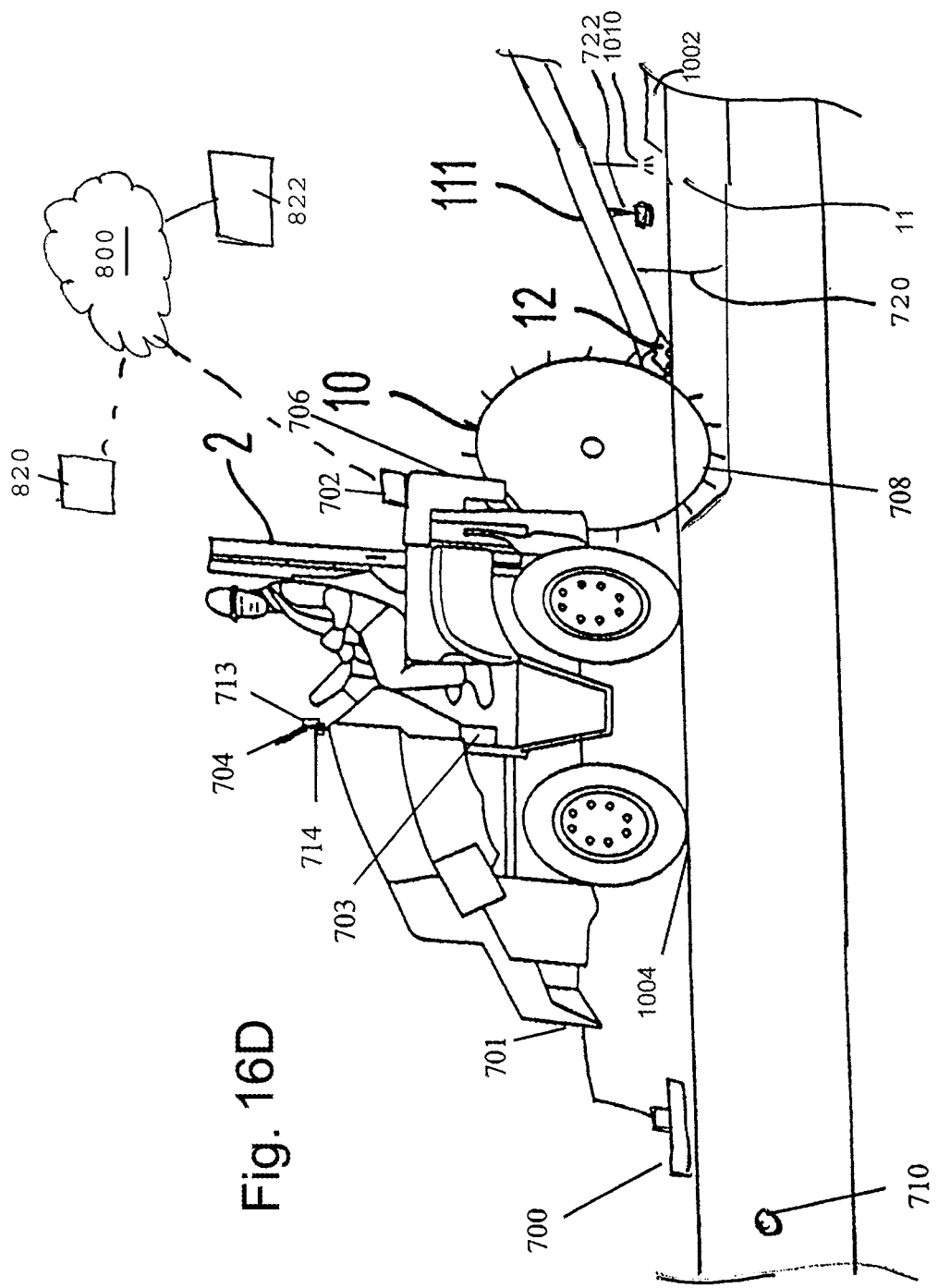
FIG. 16D illustrates a view of a fill mask being applied using a sprayer.

As shown in FIGS. 12 and 13, the device identifier fill 902 below the surface can comprise any desired fill material, for example, but not limited to dirt, spoil, sand, concrete, or flowable fill that has been colored, so that one or more specific color(s) identifies that a device 900 is buried below the device identifier fill 902. The color(s) of the device identifier fill 902 can also identify the specific type of buried device 900. For example, the device identifier fill 902 can be tinted, dyed, or painted to any color(s) to signify the location and/or type of buried device(s) 900. For example, a first color for electrical, a second color for water conduit, a third color for sewer conduit, a fourth color for cable, a fifth color for gas, a sixth color for telecommunication devices, and additional colors can be used to identify combinations of these buried devices 900 and/or other buried devices 900. The communications devices can include any of optical fibers, connectors, amplifiers, and any device utilized in communications, including but not limited to television, radio, voice, and internet. The buried devices 900 includes the multiple cables and/or innerducts/microducts 140. Orange or yellow is preferred for buried telecommunication equipment and cables. Thus, when workers are digging, if they see the device identifier fill 902 in the ground or on the digging device they can stop digging to avoid damaging the buried device(s) 900. The device identifier fill 902 can be used in any application and is not limited to microtrenching. In this instance, the device identifier fill 902 can be the fill 212, dirt or any material to which a coloring agent can be added and then used to cover the buried device. The device identifier fill 902 can be used during burying any device 900 to identify the location and/or type of the buried device 900. In addition, when microtrenching, the surface of the trench can be filled with the fill 212 or surface coating having a color to substantially match the surface, such as black for asphalt and white for cement, the below ground device identifier fill 902 can be utilized to identify the type and/or location of the buried device(s) 902. Preferably, the coloring agent is non-toxic, environmentally friendly, and will not contaminate ground water. Coloring agents, from paints and dyes, are now well known and any suitable coloring agent can be utilized in the device identifier fill 902. A preferred coloring agent (colorant) is a powdered concrete dye, such as those sold commercially from Quickrete, Stone Technologies, or DCI.

When utilizing the device identifier fill 902 in the microtrenching, the fill device 200 can fill the trench with the device identifier fill 902 and then simply spray or apply a coating or top surface of fill 212 over the device identifier fill 902. FIG. 13 illustrates the fill device 200 applying the device identifier fill 902 first in the microtrench 11 above the cable and/or innerduct/microduct 140, and then applying the colored fill 212 to match the surface. Alternatively, a coating can be sprayed or applied over the device identifier fill 902 and/or over the fill 212.

The device identifier fill 902 can be any desired thickness above the buried device 900. Preferably, the device identifier fill 902 fills most of the trench to provide a warning to construction workers digging over the buried device 900. Examples of suitable thickness are from 1 to 36 inches, preferably from 1 to 24 inches.

In addition to or in place of color, the device identifier fill 902 can incorporate other means to provide location and/or identification of the buried device 200.

Google tried to use a commercially available hand-applied, epoxy-based crack and surface repair material to fill a microtrench thinking filling a microtrench is the same as filling and repairing a crack. See for example https://www.pocketables.com/2019/02/google-fiber-finishes-digging-very-shallow-grave-in-louisville-ky-rip.html, published on Pocketable on 7 Feb. 2019. The result was an epic failure which "caused service to fail with fiber popping up onto the streets and getting ripped out of the ground" and the entire city of Louisville had to be abandoned. Google's failure clearly demonstrates that properly filling and sealing a microtrench containing an optical fiber under a roadway is different from simply filling and repairing cracks.

See also https://www.tellusventure.com/blog/microtrenching-fail-drives-google-fiber-out-of-louisville/, published on Tellus Venture Associates, 8 Feb. 2019, which demonstrates that filling the microtrench with asphalt also does not work and the seal will fail under vehicle and weather exposing the optical fiber to the environment. This article further discusses the failure of Google, stating that "the epoxy compound that Google was using to fill up the shallow slits it dug in streets for its fiber—that's how microtrenching is done—failed. The fix they planned to use was to go back, scrape the epoxy out of the slits and refill them with asphalt. Reading between the lines of Google's blog post, that technique didn't work any better—the implication is that Google would have to rip everything out and start over again if it wanted to keep doing business in Louisville." See also https://www.wdrb.com/news/business/sunday-edition-where-is-google-fiber-mostly-in-the-highlands/article_569112e0-421e-58ef-be24-c2e42e5e53d2.html, published in the Sunday Edition, WDRB, which shows pictures of the fill material laying on top of the roadway exposing the optical fiber to the environment. The article states: "But in Belknap and Deer Park, the sealant Google Fiber's contractors used to fill the trenches has popped free, leaving exposed conduit and shards of black, rubber-like material splayed in streets. That's frustrated some residents. "It feels like you are using us for a science-fair experiment," Greg Winn, an architect who lives on Boulevard Napolean, told Google Fiber representatives during a Belknap Neighborhood Association meeting on Wednesday. " . . . Our streets look awful."

Google has been aggressively attempting to copy the present fill 212 having cement, polymer bonding agent, and coloring agent that can continuously fill and seal the microtrench 11 in a single continuous step to provide a sealed microtrench 11 that substantially matches the color of the roadway in one pass. Google has tried numerous concrete type materials, such as Fast Patch which a well-known concrete crack repair product. However, the fill material based on Fast Patch oozed out of the microtrench and did not adequately seal the microtrench. Google also tried numerous tar based sealants, such as Craftco, to try and seal a microtrench. However, in one example, an inspector for the city of San Antonio was able to easily peel the Craftco tar fill from the microtrench like peeling tape. Conventional cement crack repair products are not known for successfully filling and sealing a microtrench. It is not obvious to use common crack repair and polymer containing materials to fill a microtrench in a roadway. The present invention required significant research and testing to discover a fill 212 that exhibits a fast final set (2 hours or less), high adhesion characteristics, low permeability, and a high density to provide a sealed microtrench that will not fail under exposure to the environment and vehicle traffic.

Concrete usually has a final set within 24-48 hours. Initial and final set times as used herein are measured at 72° F. (22° C.) ASTM C 191 for hydraulic cement. The fill 212 is similar to hydraulic cement in that it is similar to mortar and must prevent water infiltration into the sealed microtrench 11. The initial set time is calculated as the time elapsed between the initial contact of cement and water and the time when the needle penetration into the cured fill is at 25 mm. The final set time is calculated as the time elapsed between the initial contact of cement and water and when the needle does not sink visibly into the cured fill. In the present invention, where microtrenching is continuous, laying the optical fiber in the microtrench 11 is continuous, and then filling/sealing the microtrench 11 with the fill 212 is a continuous single step, the fill 212 has a final set time of less than 2 hours, preferably less than 1 hour, and more preferably in about 30-40 minutes. The final set time of the fill 212 can be adjusted by using faster cements, such as calcium sulfoaluminate cement, and/or by using a cement accelerator. The fill 212 exhibits a compression strength sufficient for vehicular traffic to pass over the microtrench 11 without damaging the cured fill in the microtrench 11 in a far shorter time period than prior art methods of filling a microtrench.

Examples of cement accelerators include calcium nitrate ($Ca(NO_3)_2$), calcium formate ($Ca(HCOO)_2$), sodium nitrate ($NaNO_3$), calcium chloride ($CaCl_2$)) and calcium sulfoaluminate cement. Further examples include salts of nitrate (for setting), thiocyanate (for hardening), triethanolamines, alkanolamines, carboxylic acids, sulphates, and aluminum sulphate. The accelerator can be added in an amount to provide a desired fill curing rate in the microtrench, such as a final set time of 6 hours or less, preferably 4 hours or less, and most preferably 2 hours or less.

Conventional fill devices 200, as shown if FIGS. 3 and 4, typically have multiple containers, such as dry containers that can be used for storing the cement, powdered dye, cement accelerator, aggregate, and any other dry materials, and liquid containers that can be used for storing water, liquid bonding agent, and any other liquids. The conventional fill devices 200 also can contain a mixed fill container which holds the formed flowable concrete-based fill material 212, proportioning systems for selecting amounts of dry materials and liquids to combine, mixing devices for mixing the dry materials and liquids, and delivery mechanisms for delivering the formed flowable concrete-based fill material 212 to the microtrench 11. Commercial examples of conventional fill devices 200 include the volumetric concrete mixers sold by Cemen Tech, such as the M and C series trucks, shown at www.cementech.com. Thus, using the conventional fill device 200, the cement, cement accelerator, aggregate, bonding agent, colorant, and water can be stored, mixed as desired, and then applied to the microtrench in less than 2 hours after mixing, preferably less than 1 hour after mixing, and most preferably the fill material 212 is formed and applied to the microtrench 11 in real time. In this manner, the steps of filling, sealing and coloring the microtrench can be conducted in one step continuously as discussed herein, without requiring multiples passes over the microtrench 11. The fill device 200 can follow behind the microtrencher 2 as shown in FIGS. 3-5 to provide a method of continuously cutting the microtrench 11, laying the optical fiber and/or innerduct/microduct in the microtrench 11, and filling the microtrench 11 with the flowable concrete-based fill 212 in one pass, without having to conduct multiple passes.

A preferred fill 212 for use in the present invention is formed by mixing together a polymer bonding agent, portland cement, calcium sulfoaluminate cement, a colorant, aggregate, and water. The fill 212 ingredients can be mixed in a conventional fill device 200 just before simultaneously filling and sealing the microtrench in one step, to provide a sealed microtrench having a color substantially the same as the roadway to put the roadway substantially back to an original state before cutting the microtrench A particularly preferred flowable concrete-based fill 212 can be formed by mixing together the bonding agent SC polymer, Fastrack 400 portland cement from Western Material & Design (mixture of Portland cement and calcium sulfoaluminate cement), LLC, a concrete dye, aggregate and water. The water is added in a sufficient amount to provide a desired viscosity and flow rate from the fill device 212 to fill and seal the entire microtrench 11 in one pass. This preferred fill 212 exhibited minimal shrinkage (0.020% after 28 days using ASTM C157, air cure), which is far less than conventional cement/sand mixtures. Reduced shrinkage provides a better bond to the microtrench 11 and also an even surface with the surrounding roadway. Using ASTM C39, the fill 212 exhibited a compressive strength after 2 hours 3,500 psi (24.1 MPa); 3 hours 4,300 psi (29.6 MPa); 1 day 5,740 psi (48.3 MPa); 7 days 6,680 psi (48.3 MPa); and 28 days 7,260 psi (55.2 MPa). Thus, the fill 212 exhibited a compression strength sufficient for vehicular traffic to pass over the microtrench 11 without damaging the cured fill in the microtrench 11 in a far shorter time period than prior art methods of filling a microtrench. Conventional cement/sand formulations have a substantially lower compressive strength. The bonding agent provided a sufficient bond to the sides of the road in the microtrench 11 to prevent water penetration into the sealed microtrench 11, so that the sealed microtrench 11 will not be adversely affected during freezing and thawing throughout the seasons.

The cement, cement accelerator, polymer bonding agent, colorant, and aggregate can be added in the amounts necessary to provide the required properties to fill and seal the microtrench 11 for vehicular use and exposure to the environment, and provide a final set time of 2 hours or less, as discussed above. Exemplary amounts include, based on weight % of the entire fill 212, when a cement accelerator is utilized:

1-80% cement accelerator;
1-80% cement;
0.01-5% colorant;
0.01-20% polymer bonding agent;
1-80% aggregate; and
10-80% water in an amount to provide flowable fill.

When a faster setting cement, such as calcium sulfoaluminate cement, is utilized, exemplary amounts include, based on weight % of the entire fill 212, when a cement accelerator is utilized:

0-80% cement accelerator;
1-80% cement;
0.01-5% colorant;
0.01-20% polymer bonding agent;
1-80% aggregate; and
10-80% water in an amount to provide flowable fill.

When burying telecommunications cable, such as optical fiber, additional protection can be added such steel plate above the cable and or a steel conduit around the cable.

When burying telecommunications cable, such as optical fiber, additional protection can be added such steel plate above the cable and or a steel conduit around the cable.

Microtrencher having utility avoidance safety device:

Modern cities require an extensive range of utilities to function. The utilities include at least water, electricity, gas, telephone, and fiber optics. These utilities are typically provided through underground conduits. In theory, the location of the utilities is carefully recorded and held centrally by city authorities. In practice, this does not universally occur and the location of many utilities can be unrecorded or recorded incorrectly. The determined location of the utility may be acquired by underground imaging, which is commonly accomplished by the use of ground penetrating radar (GPR). Typically, the location of utilities are separately determined by GPR and the location marked for later cutting or digging.

The present microtrenching system disclosed herein creates a microtrench on city roadways (cement or asphalt) at far faster rates than previous methods of microtrenching. In the prior art stop-and-go methods of microtrenching, there is ample time to GPR the area and provide marks on the roadways. Furthermore, in the prior art slower rate of cutting a microtrench there is less of a chance of missing a mark on the roadway. However, in the present invention, since the speed of cutting a microtrench is far greater, the chance of missing a utility mark on the roadway is greater.

A conventional GPR system comprises an electromagnetic detection unit, a computer system that receives detection data from the detection unit; a user interface device coupled to the computer system; and a display coupled to the computer system. The computer system interprets the detection data to provide a visual representation of the underground on the display. Computer systems are now well known and any suitable computer system comprising a processor in communication with non-volatile, non-transitory memory can be utilized.

U.S. patent publication No. 2003/0012411 (Sjostrom), discloses a system and method for displaying and collecting GPR data. U.S. Pat. No. 6,617,996 (Johansson), discloses a GPR system to provide an audible signal regarding size and how deep. The complete disclosures of these patents and publications are incorporated herein by reference. Ditch Witch 2450R GPR is commercial example of a GPR machine that can detect at suitable speeds of 5.6 mph.

In place of the usual GPR used to locate buried utilities, the invention can utilize other means of revealing buried utilizes or any tomography, including but not limited to, radio frequency identification, sound waves, electrons, hydraulic, vibration, magnetic, sonar, ultrasound, microwaves, xrays, gamma rays, neutrons, electrical resistivity tomography, Multi-channels Analysis of Surface Waves (MASW), and/or FDEM induction. Any of these alternatives and later developed alternatives can be utilized. Thus, the under-roadway detection unit 700 can comprise GPR and/or any other alternative for detecting objects buried under the roadway. Preferably, the under-roadway detection unit 700 comprises a GPR.

As shown in FIGS. 14A and 14B, the claimed invention utilizes an under-roadway detection unit 700 in a novel utility avoidance device for use on a modified microtrencher 2 to create a microtrench in city street (also referred to as a roadway) using the fast microtrenching system of the present invention. The under-roadway detection unit 700 can be mounted on the microtrencher 2 in front of the cutting wheel 10 to survey under the roadway before cutting the microtrench. Detection data from the under-roadway detection unit 700 can be sent to a computer system 702. The computer system 702 can send display information to the display 704 to display what is under the roadway in the same manner as conventional GPR systems. The computer system 702 can also interpret the detection data in real time to identify objects under the roadway. For example, the computer system 702 can distinguish between utilities 710 under the roadway and other objects under the roadway, such as reinforcing steel. The interpretation, i.e. a utility 710, can also be displayed on the display 704 for the microtrencher 2 operator. The computer system 702 can also determine the location of the identified utility 710, or object, to be avoided, such as depth, size, and distance from cutting wheel 10. A user interface device 713 can be coupled to the computer system for the operator to control the under-roadway detection unit 700. FIGS. 14A and 14C show the cutting wheel in a lower cutting position 708.

If the computer system 702 identifies a buried utility 710 in the path of the cutting wheel 10, the computer system can send an alert 714 to the microtrencher 2 operator, raise the cutting wheel 10 using a height adjustment device 706, and/or stop forward movement of the microtrencher 2. In this manner, there is added protection against undesirable cutting of buried utilities 710 by the cutting wheel 10.

Cutting wheel height adjustment devices 706 are known. An example is disclosed in U.S. patent publication No. 2016/0376767 (Miller), the complete disclosure of which is incorporated herein by reference. Thus, as shown in FIG. 14B, any known cutting wheel height adjustment device 706 can be use in the present invention to raise the cutting wheel 10, shown at 712, when an object buried under the roadway is identified and determined to be a utility 710 and is in the path of the cutting wheel 10 by the computer system 702.

Vehicle control systems for automatically stopping or slowing down a motorized vehicle are now well known. Examples are cruise control, crash avoidance systems, and auto drive systems. The vehicle control system can control any of the motor speed, transmission, clutch, and/or the brake system. Thus, any of these well-known vehicle control systems can be use in the present invention to stop the motorized vehicle 701, which is part of the microtrencher 2, when an under roadway utility 710 is identified and determined to be in the path of the cutting wheel 10 by the computer system 702. In this regard, the computer system 702 is in communication can be in communication with the vehicle control system 703.

Additional attachments can be connected to the computer system 702 as desired. Examples of additional attachments are shown in FIG. 14C. The connections between the additional attachments, under-roadway detection unit 700, computer system 702, network 800, user interface devices 820 and/or server 822 can be wired and/or wireless.

An example of a first additional attachment is a trench depth measurer 720 which is configured to measure the depth of the microtrench 11 and send the measurements to the computer system 702, the user interface device 820, and/or a server 822. Another additional attachment is a trench measuring device 722 that can measure width and/or depth of the microtrench 11 and send the measurements to the computer system 702, the user interface device 820, and/or a server 822. The measurements can be taken in real time. The trench measuring device 722 can optionally take video of the microtrench.

The computer system 702 can comprise a global positioning device or other positioning device to map the location of the microtrench 11, buried utilities 710 detected by the under-roadway detection unit 700, and the buried optical fiber and/or innerduct/microduct.

The computer system 702 can be connected to a network 800 for transmitting microtrenching data to a server 822 connected to the network 800 and/or user interface devices 820 connected to the network 800. The microtrenching data can include, for example, the measurements of the microtrench 11, video of the microtrench 11, location of the microtrench 11, location of the buried utilities 710 detected by the under-roadway detection unit 700, location of the buried optical fiber and/or innerduct/microduct, speed of microtrenching, and any other desired information as desired, in real time. The microtrenching data can also be stored on the computer system 702, or by any other means, such as USB, flash drives, etc., for later uploading or accessing.

With the present method and system, the location of buried utilities can be accurately determined, the microtrench 11 cut, spoil vacuumed out of the microtrench 11, the measurements of the microtrench measured 720, 722, the optical fiber and/or innerduct/microduct can be installed in the microtrench 11, and microtrench 11 filled, all conducted simultaneously and continuously at the rates disclosed herein above, which are far faster rates than previously. The microtrench information can be uploaded in real time to a central database for use by the city, managers, traffic controllers, supervisors, and any others as desired. In this manner, the actual location of buried utilities can be more precisely mapped and stored in city records.

In the description, for purposes of explanation and not limitation, specific details are set forth, such as particular networks, communication systems, computers, terminals, devices, components, techniques, storage devices, data and network protocols, software products and systems, operating systems, development interfaces, hardware, etc. in order to provide a thorough understanding of the present invention. However, it will be apparent to one skilled in the art that the present invention can be practiced in other embodiments that depart from these specific details. Detailed descriptions of well-known networks, computers, digital devices, storage devices, components, techniques, data and network protocols, software products and systems, development interfaces, operating systems, and hardware are omitted so as not to obscure the description of the present invention. All use of the word "example" are intended to describe non-limiting examples of the invention.

The operations described in the figures and herein can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

To facilitate an understanding of the principles and features of the various embodiments of the present invention, various illustrative embodiments are explained below. Although example embodiments of the present invention are explained in detail, it is to be understood that other embodiments are contemplated. Accordingly, it is not intended that the present invention is limited in its scope to the details of construction and arrangement of components set forth in the following description or examples. The present invention is capable of other embodiments and of being practiced or carried out in various ways.

As used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. Such other components or steps not described herein can include, but are not limited to, for example, similar components or steps that are developed after development of the disclosed technology.

As illustrated, lines or arrows between elements can denote communications between the different elements. These communications can take any form known by those of skill in the art, including digital, telephonic, or paper. The communications can be through a WAN, LAN, analog phone line, etc. The information communicated can be in any format appropriate for the transmission medium.

"Data storage" can be non-transitory tangible memory, such as any one or a combination of a hard drive, random access memory, flash memory, read-only memory and a memory cache, among other possibilities. The data storage can include a database, implemented as relational database tables or structured XML documents or any other format. Such a database can be used to store the information gathered from transaction records and Thing Records. Non-volatile memory is preferred.

"Processor" can refer to a single data processor on a single computing device or a collection of data processors. The collection of data processors can reside on a single computing device or be spread across multiple computing devices. The processor can execute computer program code stored in the data storage or a memory. In one example, the processor can execute computer program code representative of functionalities of various components of the system.

While certain implementations of the disclosed technology have been described in connection with what is presently considered to be the most practical and various implementations, it is to be understood that the disclosed technology is not to be limited to the disclosed implementations, but, on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams do not have to be performed in the order presented or if at all, according to some implementations of the disclosed technology.

Computer program instructions can also be stored in a non-transient computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

FIG. 14C describes an example of a system. The system comprises user interface devices 820, a server 822, and computer system 702, all interconnected via a communication network 800. All interconnections can be direct, indirect, wireless and/or wired as desired.

The network 800 can be any desired network including the internet or telephone network. Various networks 800 can be implemented in accordance with embodiments of the invention, including a wired or wireless local area network (LAN) and a wide area network (WAN), wireless personal area network (PAN) and other types of networks that comprise or are connected to the Internet. When used in a LAN networking environment, computers can be connected to the LAN through a network interface or adapter. When used in a WAN networking environment, computers typically include a modem, router, switch, or other communication mechanism. Modems can be internal or external, and can be connected to the system bus via the user-input interface, or other appropriate mechanism. Computers can be connected over the Internet, an Intranet, Extranet, Ethernet, or any other system that provides communications, such as by the network. Some suitable communications protocols can include TCP/IP, UDP, OSI, Ethernet, WAP, IEEE 802.11, Bluetooth, Zigbee, IrDa, WebRTC, or any other desired protocol. Furthermore, components of the system can communicate through a combination of wired or wireless paths, including the telephone networks.

The system can be accessed via any user interface device 820 that is capable of connecting to the server 822 via the network 800. A plurality of user interface devices 822 can be connected to the server 800. An example user interface device 820 contains a web browser and display. This includes user interface devices 820 such as internet connected televisions and projectors, tablets, iPads, Mac OS computers, Windows computers, e-readers, and mobile user devices such as the smartphones, iPhone, Android, and Windows Phone, and other communication devices. The user interface device 820 preferably is a smartphone. The smartphone 820 can be in any form, such as a hand held device, wristband, or part of another device, such as vehicle.

The computer processing unit (CPU) of the user interface device 820 can be implemented as a conventional microprocessor, application specific integrated circuit (ASIC), digital signal processor (DSP), programmable gate array (PGA), or the like. The CPU executes the instructions that are stored in order to process data. The set of instructions can include various instructions that perform a particular task or tasks, such as those shown in the appended flowchart. Such a set of instructions for performing a particular task can be characterized as a program, software program, software, engine, module, component, mechanism, or tool. The non-transitory memory can include random access memory (RAM), ready-only memory (ROM), programmable memory, flash memory, and the like. The memory, include application programs, OS, application data etc.

The server 822 and/or computer system 702 described herein can include one or more computer systems directly connected to one another and/or connected over the network 800. Each computer system can include a processor, non-transitory memory, user input and user output mechanisms, a network interface, and executable program code (software) comprising computer executable instructions stored in non-transitory tangible memory that executes to control the operation of the server 822 and/or computer system 702. Similarly, the processors functional components formed of one or more modules of program code executing on one or more computers. Various commercially available computer systems and operating system software can be used to implement the hardware and software. The components of each server can be co-located or distributed. In addition, all or portions of the same software and/or hardware can be used to implement two or more of the functional servers (or processors) shown. The server 822 and/or computer system 702 can run any desired operating system, such as Windows, Mac OS X, Solaris or any other server based operating systems. Other embodiments can include different functional components. In addition, the present invention is not limited to a particular environment or server 822 and/or computer system 702 configuration. Preferably, the server 822 is a cloud based computer system. If desired for the particular application, the server 822 or portions of the server 822 can be incorporated within one or more of the other devices of the system, including but not limited to a user interface device 820.

The server 822 includes at least one web server and the query processing unit. The web server receives the user query and sends the user query to the query processing unit. The query processing unit processes the user query and responds back to the user interface device 820 and/or computer system 702 via the web server. The query processing unit fetches data from the database server if additional information is needed for processing the user query. The database is stored in a non-transitory tangible memory, and preferably a non-volatile memory. The term "database" includes a single database and a plurality of separate databases. The server 822 can comprise the non-volatile memory or the server 822 can be in communication with the non-volatile memory storing the database. The database can be stored at different locations.

Software program modules and data stored in the non-transitory memory the server 822 and/or non-volatile memory of the user interface device 820 and/or computer system 702 can be arranged in logical collections of related information on a plurality of computer systems having associated non-volatile memories. The software and data can be stored using any data structures known in the art including files, arrays, linked lists, relational database tables and the like. The server 822, computer system 702 and mobile user device 820 can be programmed to perform the processes described herein.

Fill Mask:

Another embodiment of the invention is shown in FIGS. 16A through 16D, which relates to applying a fill mask composition to the roadway surface to form a fill mask 1002 that prevents fill overfill and/or fill spillage, shown at 1212, from bonding to the roadway surface 1004 or staining the roadway surface 1004. Once the fill overfill and/or fill spillage 1212 sets, the set fill overfill and/or fill spillage 1212 can simply be removed from the fill mask 1002 by sweeping or using a vacuum. When using the fast curing fill 212 described herein, the set fill overfill and/or fill spillage 1212 can be swept or vacuumed from the fill mask 1002 in less than 2 hours, preferably less than 30 minutes, after filling the microtrench with the fill 212.

The fill mask composition can be applied to the roadway surface 1004 to provide a fill mask 1002 on at least one side, preferably both sides, of the microtrench 11. The fill mask composition can be applied in any desired manner, such as by paint rollers 1008 or spraying 1010. Preferably, care should be taken to avoid having the fill mask composition being applied inside the microtrench 11 to avoid the fill mask composition from adversely affecting the bond between the fill 212 and the surfaces of microtrench 11. Any desired width of fill mask 1002 can be used. For example, a 0.5 to 16 inches wide fill mask 1002 can be applied to the roadway surface 1004 on each side of the microtrench 11. The fill mask composition is preferably applied to the roadway surface 1004 after cutting the microtrench 11. However, the fill mask composition can be applied to the roadway surface 1004 before cutting the microtrench if desired.

If the fill mask 1002 is clear or substantially matches the color of the roadway surface 1004, the fill mask 1002 can be left in place to wear away by exposure to the environment.

The inventors have found that concrete sealing compositions can be used in the present novel method to form the fill mask 1002 to prevent fill or overfill and/or fill spillage 1212 from bonding to a roadway surface 1004. Thus, any suitable concrete sealing composition can be utilized as the fill mask composition in the present invention. Commercial examples of suitable concrete sealing compositions include those sold under the names Thompson's Waterseal Clear Mutli-Surface Waterproofer, Foundation Armour, Quikrete Acrylic Concrete, Rainguard, BEHR wet-lock sealer, Glaze'n Seal, DAICH, RandonSeal, Eagle, Krystol, and others. Preferred fill mask compositions comprise an acrylic. The concrete sealants can be use on any type of roadway, including concrete or asphalt. For asphalt roadways, asphalt sealants can be utilized as the fill mask material because they are usually black in color to match the black color of the asphalt. Examples of suitable commercially available asphalt sealants include Aquaphalt, Black Jack, Rust-oleum, Techspray, Rhino, Grainger, Flex Seal, and others. The sealant can be water based. For example, suitable sealants can comprise any of oils, waxes, linseed oil, acrylic resins, epoxies, urethanes, silanes, silicates, siliconates, or siloxane.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method of installing an optical fiber and/or innerduct/microduct under a roadway surface comprising:
   cutting a microtrench in a roadway with a microtrencher, the roadway having a roadway surface that vehicles contact;
   installing the optical fiber and/or innerduct/microduct in the microtrench;
   applying a fill mask composition on the roadway surface to form a fill mask on the roadway surface on at least one side of the microtrench; and
   filling the microtrench with the fill material after applying the fill mask to the roadway surface, wherein the fill mask prevents overfill and/or spillage of the fill material from bonding to the roadway surface or staining the roadway surface that vehicles contact.

2. The method according to claim 1, wherein the fill mask is applied to the roadway surface after forming the microtrench.

3. The method according to claim 1, wherein the fill mask is applied to the roadway surface before forming the microtrench.

4. The method according to claim 1, wherein the fill mask is applied to the roadway surface by a paint roller.

5. The method according to claim 1, wherein the fill mask is applied to the roadway surface by spraying.

6. The method according to claim 1, wherein the fill mask is substantially clear or substantially matches a color of the roadway.

7. The method according to claim 1, further comprising ensuring that no fill mask composition is applied within the microtrench to avoid negatively affecting bonding between surfaces within the microtrench and a fill material.

8. The method according to claim 1, wherein the fill mask composition comprises a sealant.

9. The method according to claim 1, further comprising:
   providing the microtrencher having a utility avoidance system comprising a motorized vehicle;
   a cutting wheel connected to the vehicle and being configured to continuously cut through the roadway and create the microtrench in the roadway; and
   a utility avoidance device connected to the vehicle comprising:
      an under-roadway detection unit configured to detect a buried utility under the roadway before the cutting wheel cuts the microtrench in the roadway;
   a computer system configured to receive detection data from the under-roadway detection unit;
      a user interface device coupled to the computer system;
      a display coupled to the computer system, wherein the computer system is configured to interpret the detection data and identify the buried utility under the roadway, determine whether the buried utility is within the path of the cutting wheel, and at least one of sending an alert to an operator of the microtrencher, stopping forward movement of the vehicle, or raising the cutting wheel in relation to the roadway to avoid cutting the buried utility within the path of the cutting wheel;
   continuously cutting a microtrench in the roadway;
   detecting a buried object under the roadway by the utility avoidance system;
   identifying the buried object as the buried utility;
   determining that the buried utility is in the path of the cutting wheel; and
      at least one of sending an alert to the operator of the microtrencher, stopping forward movement of vehicle by vehicle control system in communication with the vehicle, or raising the cutting wheel in relation to the roadway by a height adjustment device in communication with the computer system to avoid cutting the buried utility within the path of the cutting wheel.

10. The method according to claim 9, further comprising the cutting wheel height adjustment device configured to raise and lower the cutting wheel in relation to the roadway, the cutting wheel height adjustment device is in communication with the computer system, and the computer system raises the cutting wheel to avoid cutting the buried utility within the path of the cutting wheel.

11. The method according to claim 9, further comprising a vehicle control system configured to control the speed of the vehicle, the vehicle control system is in communication with the computer system, and the computer system slows a speed of the vehicle to avoid cutting the buried utility within the path of the cutting wheel.

12. The method according to claim 11, wherein the vehicle control system is configured to control a brake for the vehicle, and the computer system stops the vehicle to avoid cutting the buried utility within the path of the cutting wheel.

13. The method according to claim 9, wherein the under-roadway detection unit comprises a ground penetrating radar system.

14. The method according to claim 9, wherein the under-roadway detection unit comprises a radio frequency identification system.

15. The method according to claim 9, further comprising measuring dimensions of the microtrench.

16. The method according to claim 1, further comprising continuously laying optical fiber cable or innerduct/microduct within the microtrench and continuously filling the microtrench with the fill material.

17. The method according to claim 16, further comprising continuously transporting at least a portion of a spoil from the microtrencher to a first container constructed to contain the spoil using at least one spoil transporting device; and continuously laying the cable and/or innerduct/microduct in the micro-trench from a reel device.

18. The method according to claim 17, wherein the steps of continuously transporting the spoil from the micro-trencher to the first container constructed to contain spoil using a first spoil transporting device and continuously laying at least one of the of optical fiber cable and innerduct/microduct in the micro-trench from a reel device are conducted using the micro-trencher using a multifunctional reel carrier, spoil material handling container device comprising:
a first truck or first trailer;
the first container constructed to contain the spoil being on the first truck or first trailer; and
the at least one spoil transporting device constructed to transfer the spoil from the micro trencher and deposit the spoil in the first container.

19. The method according to claim 1, further comprising forming the fill material in a fill device by mixing together a cement, a polymer bonding agent, an aggregate, and water, wherein the polymer bonding agent provides adhesion to the existing roadway to seal the microtrench against water infiltration, the fill material having a final set time of 2 hour or less, and the fill material is configured to flow into the microtrench from the fill device; and
continuously filling the microtrench with the fill material from the fill device to cover the optical fiber and/or innerduct/microduct, fill and seal the microtrench and return the roadway substantially back to the original state with the filled and sealed microtrench.

20. The method according to claim 19, further comprising mixing a cement accelerator into the flowable concrete-based fill in an amount to provide the fill material with the final set time of less than 2 hours.

21. The method according to claim 19, wherein the cement comprises calcium sulfoaluminate cement in an amount to provide the fill material with the final set time of less than 2 hours.

22. The method according to claim 19, further comprising forming the fill material in real time and filling the microtrench by the fill device in real time.

23. The method according to claim 19, further comprising mixing a cement accelerator into the fill material in an amount to provide the fill material with the final set time of less than 1 hour.

24. The method according to claim 19, wherein the cement comprises calcium sulfoaluminate cement in an amount to provide the fill material with the final set time of less than 1 hour.

25. The method according to claim 19, further comprising forming the fill material so that the fill material flows from the fill device into the microtrench having a width of less than 2 inches and a depth of 2 inches to 20 inches.

26. The method according to claim 19, further comprising adding a colorant to the fill material to provide the fill material with a color substantially matching the color of the roadway.

* * * * *